US006014168A

United States Patent [19]
Webb et al.

[11] Patent Number: 6,014,168
[45] Date of Patent: Jan. 11, 2000

[54] SCREEN MAPPING OF A CATHODE RAY TUBE

[75] Inventors: James R. Webb, Boulder; Ron C. Simpson, Erie, both of Colo.

[73] Assignee: Display Laboratories, Inc., Boulder, Colo.

[21] Appl. No.: 08/638,222

[22] Filed: Apr. 26, 1996

[51] Int. Cl.[7] .................................................. H04N 17/00
[52] U.S. Cl. .......................................... 348/190; 348/806
[58] Field of Search ..................................... 348/177, 184, 348/189, 190, 191, 806, 807; 315/368.12, 368.13, 370; H04N 17/00

[56] References Cited

U.S. PATENT DOCUMENTS

| | | | |
|---|---|---|---|
| 3,995,269 | 11/1976 | Schumacher | 345/180 |
| 4,058,826 | 11/1977 | Schneider | 358/10 |
| 4,506,292 | 3/1985 | Newton et al. | 358/34 |
| 4,523,188 | 6/1985 | Huber | 340/734 |
| 4,654,706 | 3/1987 | Davidson et al. | 358/139 |
| 4,672,275 | 6/1987 | Ando | 358/10 |
| 4,757,239 | 7/1988 | Starkey | 315/371 |
| 4,772,948 | 9/1988 | Irvin | 358/139 |
| 4,816,908 | 3/1989 | Colineau et al. | 358/60 |
| 4,817,038 | 3/1989 | Knoll et al. | 364/413.24 |
| 4,857,998 | 8/1989 | Tsujihara et al. | 348/190 |
| 4,897,721 | 1/1990 | Young et al. | 358/139 |
| 4,952,851 | 8/1990 | Macaulay | 315/398 |

(List continued on next page.)

FOREIGN PATENT DOCUMENTS

| | | | |
|---|---|---|---|
| 0404700 | 12/1990 | European Pat. Off. | H04N 17/04 |
| 0448267 | 9/1991 | European Pat. Off. | H04N 17/04 |
| 0257096 | 11/1986 | Japan | H04N 17/04 |

OTHER PUBLICATIONS

Paul C. Lyon, "A Wide Field-Of-View CRT Projection System with Optical Feedback for Self-Alignment", Evans & Sutherland Computer Corporation.

James R. Webb; Micro-Chip Architecture for Full Digital Control of Geometry, Convergence and Colorimetry in CRT Monitors, Jun. 1994.

Charles Chuang et al; A Non-impact High Resolution Geometry Alignment System for Monitor Production. Paper given at Society for Information Display, San Jose, California, Jun. 1994.

Society for Information Display International Symposium, Digest of Technical Papers, vol. XXV, Jun. 14–16, 1994.

CRT Display Inspection with a Solid State Camera, by Gregory A. Kern. Paper given at Society for Information Display, San Jose, California, Jun. 1994.

(List continued on next page.)

*Primary Examiner*—Sherrie Hsia
*Attorney, Agent, or Firm*—William W. Cochran

[57] ABSTRACT

A system for generating correction factor data that is representative of the distortion characteristics of a cathode ray tube. The correction factor data is stored with a cathode ray tube to allow later alignment of a video signal, or can be provided on a storage medium or on a network. Distortion data, and resultant correction factor data is generated for a series of discrete physical locations on the cathode ray tube screen. In this manner, the entire screen surface can be utilized to align a video image. Maximum correctable distortion data is also generated in accordance with the present invention to provide exit criteria for cathode ray tube manufacturers. The exit criteria is based upon maximum correction factor data that can be generated to correct distortions. A characterization module is provided that can be coupled to cathode ray tube coils that stores the correction factor data or an identification number for the cathode ray tube that can be used to retrieve the correction factor data from any desired source such as CD ROMS, a LAN, a database coupled to a WAN, or the Internet, etc. Interpolation techniques can be used to generate correction factor data for any desired number of interpolation points based upon correction factor data provided for a lesser number of characterization locations.

37 Claims, 15 Drawing Sheets

U.S. PATENT DOCUMENTS

| | | | |
|---|---|---|---|
| 5,020,116 | 5/1991 | Macaulay | 358/60 |
| 5,059,979 | 10/1991 | Micic et al. | 341/152 |
| 5,081,523 | 1/1992 | Frazier | 358/29 |
| 5,216,504 | 6/1993 | Webb et al. | 358/139 |
| 5,276,458 | 1/1994 | Sawdon | 345/132 |
| 5,432,548 | 7/1995 | Byen et al. | 348/180 |
| 5,434,595 | 7/1995 | Macaulay | 345/207 |
| 5,440,340 | 8/1995 | Tsurutani et al. | 348/190 |
| 5,504,521 | 4/1996 | Webb et al. | 348/180 |
| 5,506,481 | 4/1996 | Wada et al. | 348/806 |
| 5,510,833 | 4/1996 | Webb et al. | 358/139 |
| 5,592,240 | 1/1997 | Sakamoto et al. | 348/806 |

OTHER PUBLICATIONS

Firmware for a Continuous Frequency CRT Monitor, Steven J. Lassman. Paper given at Society for Information Display, San Jose, California, Jun. 1994.

Society for Information Display, Digest of Technical Papers, Feb. 6–8, 1996.

IEEE 1988 International Conference on consumer Electronics, Jun. 8–10, 1988.

W. Press, S. Teukolsky, W. Vetterling and B. Flannery, Numerical Recipes in C—the Art of Scientific Computing at 123–128 (2nd ed. 1988).

SGS Thompson Catalog of Components for Multisync Monitors.

Display Laboratories, Inc., Minicam Automated Monitor Alignment & Inspection System, 1994.

Display Laboratories, Inc., DLAB43A, Advanced Information, 1995.

Display Laboratories, Inc., DLAB494, Advanced Information, 1995.

Display Laboratories, Inc. DLAB520A, Advanced Information, 1995.

SCREEN MAPPING OF A CATHODE RAY TUBE

BACKGROUND OF THE INVENTION

FIELD OF INVENTION

The present invention pertains generally to cathode ray tubes and more particularly to the alignment of video signals on cathode ray tubes.

DEFINITIONS

Align means to cause a video image to be adjusted to that distortion characteristics are minimized and the video image that is displayed on the cathode ray tube forms an image that is pleasing to the eye.

Alignment camera means the video used to generate a signal that is representative of the image displayed on the cathode ray tube in a manner described in U.S. Pat. No. 5,216,504.

Alignment specifications means a limit set for the distortion data of each correction factor parameter to provide an aligned video image.

Bar code means any sort of optically encoded data.

Cathode ray tube means the tube structure, the phosphor screen, the neck of the tube, the deflection and control windings, including the yoke and other coils, and the electron guns.

Characterization module means a device that is coupled in some manner to a cathode ray tube and may include a storage device for storing correction factor data or an indentification number for the cathode ray tube, and/or a processing device such as a micro-processor or other logic device, and/or driver and correction circurits, and/or control circuitry. The characterization module can also store parametric data for use in aligning monitors that employ standardized transformation equations.

Coordinate locations means the discrete physical locations on the face of the cathode ray tube, or a physical area on the CRT screen.

Correction and driver circuitry means one or more of the following: digital to analog converters, interpolation engine, pulse width modulators and pulse density modulators, as well as various summing amplifiers, if required. These devices are capable of producing correction control signals that are applied to control circuitry to generate an aligned video image.

Correction control signals means correction factor signals that have been combined in a manner to be applied to either horizontal control circuitry, vertical control circuitry, or electron gun circuitry.

Correction factor data comprises the encoded digital bytes or any other form of data that are representative of the amount of correction required to align a video signal at a particular physical location on a cathode ray tube to counteract distortion characteristics at that location. Correction factor data may include data from the gain matrix table, data relating to electron gun characteristics and/or data relating to geometry characteristics of the cathode ray tube.

Correction factor parameters include various geometry characteristics of the cathode ray tube including horizontal size, vertical size, horizontal center, vertical center, pincushioning, vertical linearity, keystoning, convergence, etc., and various electron gun characteristics of the cathode ray tube including contrast, brightness, luminosity, focus, color balance, color temperature, electron gun cutoff, etc.

Correction factor signals means digital correction signals that have been integrated or filtered.

Correction signals means digital correction signals and correction factor signals.

Decoder means a device for generating an electronic signal in response to one or more data bytes that may include PWMs, PDMs, DACs, interpolation engines, on-screen display chips, etc.

Digital correction signals means signals that are generated by decoders, such as pulse width modulators, pulse density modulators, digital to analog converters, etc. in response to correction factor data.

Digitized signal is any electrical signal that has a digital nature.

Direction means up, down, left, right, brighter, dimmer, higher, lower, etc.

Discrete locations may mean individual pixels on a cathode ray tube screen or may comprise a plurality of pixels on a cathode ray tube screen.

Distortion characteristics means the amount of distortion as indicated by the distortion data at a number of different points on the cathode ray tube.

Distortion data is a measure of the amount of distortion that exists on a cathode ray tube with regard to the geometry characteristics of the tube, and/or electron gun characteristics of the tube. For example, distortion data can be measured as a result of misalignment of a video image or improper amplitude or gain of a video signal. Distortion data can be a quantitative measure of the deviation of correction factor parameters from a desired quantitative value. Distortion data can be measured at coordinate locations on the cathode ray tube.

Driver signals are the electrical signals that are used to drive the deflection and control windings, and electron guns of the cathode ray tube.

Exit criteria means a limit set for the distortion data of each correction factor parameter that allows generation of correction factor data that is capable of producing an aligned video image.

Frame grabber means an electronic device for capturing a video frame.

Gain matrix table means a table of values that are used to indicate how a change in correction factor data for one correction factor parameter influences the change in the correction factor data for other correction factor parameters, as disclosed in U.S. patent application Ser. No. 08/611,098, filed Mar. 5, 1996, entitled "Method and Apparatus for Making Corrections in a Video Monitor."

Golden tube means a sample cathode ray tube having limit distortion characteristics for a particular model of cathode ray tube.

Integrators means a device for generating an integrated signal that is the time integral of an input signal.

Interpolation engine means a device for generating continuously variable signals, such as disclosed in U.S. patent application Ser. No. 08/613,902 filed Mar. 11, 1996, U.S. Pat. No. 5,739,870, by Ron C. Simpson entitled "Interpolation Engine for Generating Gradients."

Logic device means any desired device for reading the correction factor data from a memory and transmitting it to correction and driver circuitry, including a micro-processor, a state machine, or other logic devices.

Magnetic strip means any sort of magnetic storage medium that can be attached to a cathode ray tube.

Maximum correctable distortion data means the limits of the distortion data for which an aligned video signal can be generated for any particular cathode ray tube using predetermined correction and driver circuitry, and control circuitry.

Memory comprises any desired storage medium including, but not limited to, EEPROMS, RAM, EPROMs, PROMs, ROMs, magnetic storage, magnetic floppies, bar codes, serial EEPROMs, flash memory, etc.

Non-volatile electronic storage device means an electrical memory device that is capable of storing data that does not require a constant supply of power.

Pattern generator means any type of video generator that is capable of generating a video signal that allows measurement of distortion data.

Processor means a logic device including, but not limited to, serial EEPROMs, state machines, micro-processors, etc.

Production cathode ray tube means a cathode ray tube that is part of a production line.

Pulse density modulation means a device for generating pulse density modulation signals in response to one or more data bytes, such as disclosed in U.S. patent application Ser. No. 08/611,098, filed Mar. 5, 1996 by James R. Webb et al entitled "Method and Apparatus for Making corrections in a Video Monitor."

Pulse width modulator means a device that generates pulse width modulated signals in response to one or more data bytes, such as disclosed in U.S. patent application Ser. No. 08/611,098, filed Mar. 5, 1996 that is cited above and U.S. Pat. No. 5,216,504.

Storage disk comprises any type of storage device for storing data including magnetic storage devices such as floppy disks, optical storage devices, magnetic tape storage devices, magneto-optical storage devices, compact disks, etc.

Summing amplifiers means devices that are capable of combining a plurality of input signals such as disclosed in U.S. patent application Ser. No. 08/611,098 filed Mar. 5, 1996, that is cited above.

Transformation equation means a standard form equation for producing a correction voltage waveform to correct distortion characteristics of a cathode ray tube.

Universal monitor board means a device that includes one or more of the following: vertical control circuitry, horizontal control circuitry, electron gun control circuitry, correction and driver circuitry, a logic device and a memory. A universal monitor board may comprise an actual chassis monitor board used with a particular monitor, an ideal chassis board, a chassis board that can be adjusted to match the characteristics or specifications of a monitor board, etc.

Video image means the displayed image that appears on the cathode ray tube screen that is produced in response to a video signal.

Video pattern is the video image of a pattern that appears on the cathode ray tube as a result of the video signal generated by the pattern generator.

Video signal means the electronic signal that is input into the electron guns of the cathode ray tube.

DESCRIPTION OF THE BACKGROUND

In the process of constructing and assembling cathode ray tubes and cathode ray tube monitors, it is necessary to adjust certain alignment parameters (correction factor parameters) to achieve desired display characteristics of a video image on the cathode ray tube monitor. In other words, it is necessary to align the system so that video images displayed on the cathode ray tube are properly aligned to provide a pleasing image. Traditionally, video monitors have been adjusted by skilled operators in the factory, prior to shipment to the customer, to achieve proper alignment. The process of manual alignment of monitors has many disadvantages. For example, manual alignment procedures require physical measurement of the displayed image so that the accuracy of measurements is greatly dependent on the skill of the operator. Operator fatigue often results in inaccurate measurements. Additionally, consistent, objective and repeatable adjustments are not obtainable with a manual system. It is also difficult to hire and retain employees who are willing to work late hours to increase factory throughput.

U.S. Pat. No. 5,216,504, issued to James R. Webb, et al, entitled "Automatic Precision Video Monitor Alignment System" is specifically incorporated herein by reference for all that it discloses and teaches. This patent discloses a system that uses a single video camera placed in front of a video monitor to capture a video image which is then supplied to an alignment computer for analysis of the physical characteristics of the video image. The alignment computer generates parametric data that is utilized in transformation equations that are stored in memory in the monitor. The transformation equations are used by the processor in the monitor to generate data that is used to align the monitor. As disclosed in U.S. patent application Ser. No. 08/611098 filed Mar. 5, 1996 that is cited above, which is hereby incorporated by reference for all that it discloses and teaches, these transformation equations model distortion characteristics using standard parabolic equations or least squares regression equations. Parameters of the transformation equations are stored in the memory in the monitor with the transformation equations. The stored parameters and transformation equations provide correction for typical distortions encountered in a monitor of the same make and model. The vision system provides modified parameters to align each individual monitor.

Although these transformation equations provide adequate correction for distortions that occur over most portions of the screen, the distortions that occur on some portions of the screen, particularly along the outer edges and the corners, are too severe to be accurately corrected using these standard correction voltage waveforms. As a result, monitors are often aligned so that the video signal is shifted inwardly from these outer portions of the screen where the video image can be adequately corrected using standard transformation equations. As a result, the video image is substantially smaller than the available space on the cathode ray tube monitor screen. It would therefore be desirable to be able to correct distortions on all portions of the screen in a simple and easy manner to allow the video image to occupy the full surface area of the screen.

Vision systems have also been used by cathode ray tube manufacturers, as opposed to monitor manufacturers, to generate distortion data. Use of vision systems by both monitor manufacturers and cathode ray tube manufacturers results in a duplication of effort and unnecessary capital expenditures. Cathode ray tube manufacturers, unlike monitor manufacturers, are responsible for manually aligning the control and deflection coils on the neck of the tube that provide initial alignment of the video signal. Cathode ray tubes have typically been manually aligned by highly skilled technicians. These highly skilled technicians use various techniques for manually positioning the various deflection and control coils on the neck of the cathode ray tube so that a video signal applied to the cathode ray tube produces a video image that falls within certain alignment specifications. For example, the alignment specifications for a cathode ray tube may require that when an uncorrected video signal is generated on the cathode ray tube, a maximum distortion of only a predetermined number of millimeters of pincushioning be present on each vertical side of the video signal. These cathode ray tube specifications (exit criteria) are often difficult to meet and require skilled technicians to achieve these results. This may limit the production throughput and yield of the cathode ray tube manufacturing plant. Additionally, the techniques of manually aligning the deflection and control circuitry and electron guns on a tube is time consuming and tedious work that is subject to failure, in the same manner as disclosed above with regard to manually aligning monitors. Since correction and driver circuitry is capable of producing corrections over a wide range of distortion characteristics, in many instances, the complex mechanical processes of aligning the deflection and control windings, and electron guns is performed with unnecessary precision. Currently, there is no automated method of establishing these exit criteria to prevent unnecessary precision, or for automatically determining whether such exit criteria have been met by a cathode ray tube on a production line.

As may be readily apparent, the use of standard transformation equations and the generation of parametric data to be used in the transformation equations comprises an effective method of compressing or minimizing the data that is stored in the monitor that is required to generate an aligned video image. However, the desire to store more parametric data to produce even better aligned monitors has resulted in a proportionally larger amount of program data required to interpret and process the parametric data. This has caused manufacturers to increase the amount of storage in the monitor. The use of 16K to 20K of EEPROM has become prevalent in the industry. Similarly, monitor manufacturers have been forced to provide higher speed processing devices, such as high speed, robust, micro-processors to process the large amount of correction factor data and program data and instructions that is stored in the monitor in a timely fashion. These increased storage capacities and higher processing speeds have resulted in a noticeable increase in cost of monitors. Such an increase in cost may not be justified in some low-priced monitors, which has resulted in such monitors having either minimal or no correction capabilities.

It would therefore be desirable to provide a system for aligning monitors in an inexpensive and simple manner which minimizes the capital investment in vision systems, requires a minimal amount of storage and utilizes a simple processing chip that is inexpensive to implement.

It is against this background, and the limitations and problems associated therewith, that the present invention has been developed.

SUMMARY OF THE INVENTION

The present invention overcomes the disadvantages and limitations of the prior art by providing, in general, a system for generating and storing correction factor data representative of distortion characteristics of a cathode ray tube to align a video signal on the cathode ray tube comprising, a pattern generator that generates a video pattern that is displayed on the cathode ray tube, an alignment camera that generates image signals representative of the video pattern, an alignment computer that captures the image signals of the video pattern, measures distortion data for a plurality of correction factor parameters at a series of discrete locations on the cathode ray tube and generates correction factor data from the distortion data, a universal monitor board that generates driver signals in response to the correction factor data to align the video pattern, and, a characterization module coupled to the cathode ray tube that stores the correction factor data.

The present invention may also comprise an apparatus for generating correction control signals for driving control circuitry to produce an aligned video signal on a cathode ray tube comprising, a memory that stores correction factor data representative of distortion characteristics of the cathode ray tube, and correction and driver circuitry that decodes the correction factor data and generates the correction control signals in response to the correction factor data.

The present invention may also comprise a method of generating an aligned video signal on a cathode ray tube comprising the steps of, generating correction factor data from distortion data measured for a plurality of correction factor parameters, storing the correction factor data with the cathode ray tube, reading the correction factor data stored with the cathode ray tube, and, decoding the correction factor data and generating driver signals in response to the correction factor data that produced the aligned video signal on the cathode ray tube.

The present invention may also comprise a method of determining whether distortions in a video signal displayed on a cathode ray tube can be corrected by modifying driver signals that are used to generate and display the video signal on the cathode ray tube comprising the steps of, measuring distortion data of the video signal for a plurality of correction factor parameters, comparing the distortion data with a set of maximum correctable distortion data that has been generated from similar cathode ray tubes, and rejecting the cathode ray tube if the distortion data is greater than the maximum correctable distortion data.

The advantages of the present invention are that correction factor data that characterizes the distortions of the cathode ray tube is stored in a characterization module with the cathode ray tube, or in some other form, such as a bar code, or magnetic strip. This data is generated by the cathode ray tube manufacturer to insure that the cathode ray tube meets the exit criteria required by the monitor manufacturer. A minimum number of points, such as a grid of 25 points, can be used to store the correction factor data for each correction factor parameter. Of course, any number of coordinate locations on the cathode ray tube can be used for any particular correction factor parameter. However, when the video signal is positioned to coincide with the series of coordinate locations on the cathode ray tube, alignment is achieved with a high degree of accuracy. Various interpolation engines can be used to provide the desired correction factor data such as disclosed in the above-cited U.S. application Ser. No. 08/613902 filed Mar. 11, 1996, U.S. Pat. No. 5,739,870, by Ron C. Simpson entitled "Interpolation Engine for Generating Gradients" which is specifically incorporated herein for all that it discloses and teaches. Such an interpolation engine can of course, be used to interpolate either in a vertical or horizontal direction.

DETAILED DESCRIPTION OF THE PREFERRED EMBODIMENTS OF THE INVENTION

Figure 1:
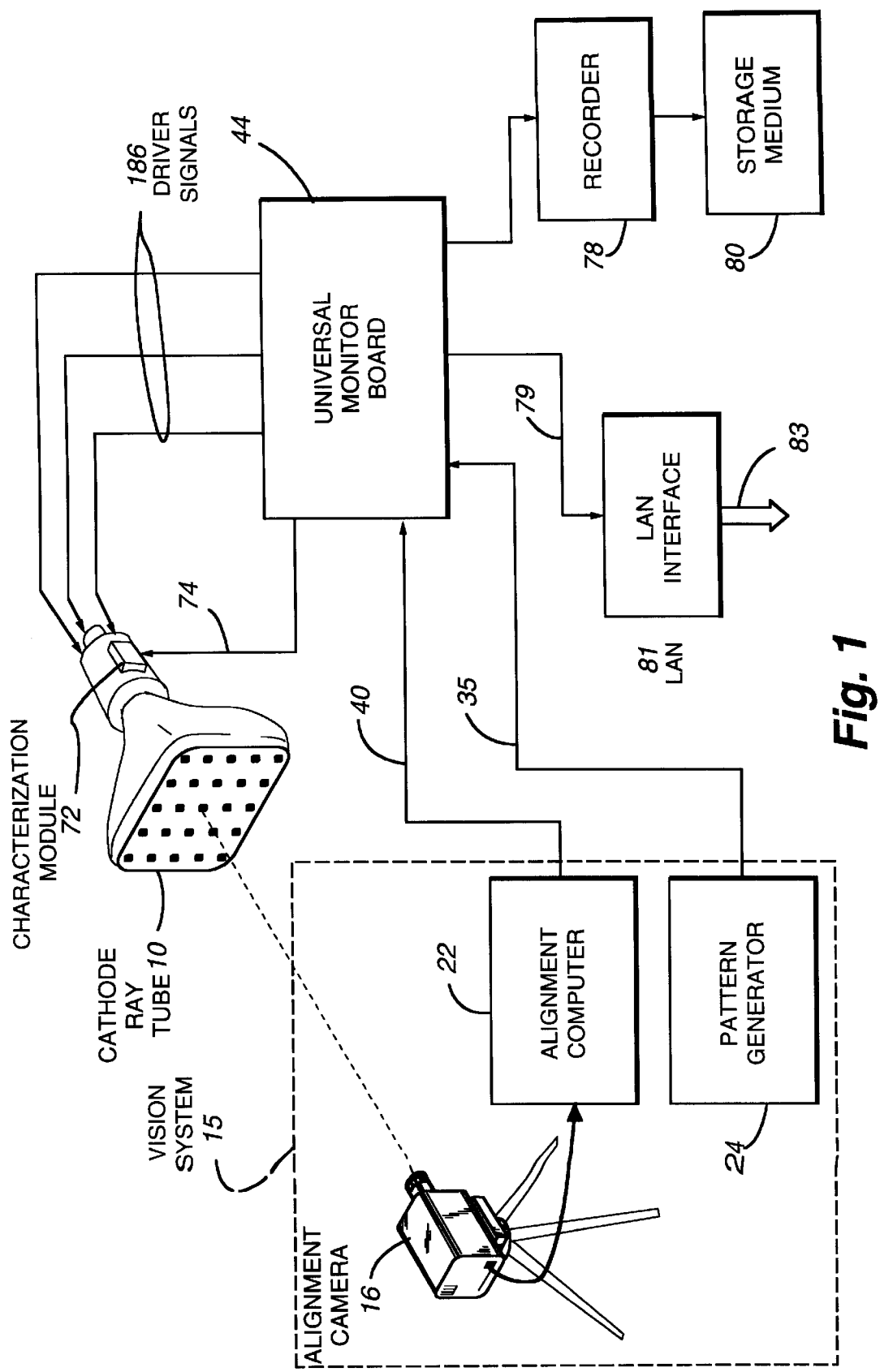
FIG. 1 is a schematic diagram of the system of the present invention for generating correction factor data, parametric data and maximum correctable distortion data.

FIG. 1 discloses a schematic illustration of a system for generating maximum correctable distortion data, correction factor data, and parametric data. Hence, cathode ray tube 10 can comprise a golden tube when maximum correctable distortion data is being generated, and a production cathode ray tube when correction factor data and parametric data is being generated. A vision system 15 is positioned such that alignment camera 16 records a video image of a pattern displayed on cathode ray tube 10. The alignment computer 22 captures the video image and analyses it to produce either correction factor data, parametric data or maximum correctable distortion data that is transmitted to universal monitor board 44 via connector 40. When the system of FIG. 1 is being used to map the screen of cathode ray tube 10 to provide alignment data, either correction factor data or parametric data are generated by alignment computer 22 depending upon the particular type of monitor board that is going to be used in the monitor chassis in which the cathode ray tube 10 is going to be placed. If the monitor board uses transformation equations, parametric data will be generated as disclosed in U.S. Pat. No. 5,216,504. Correction factor data is generated by alignment computer 22 for the correction and driver circuitry employed in accordance with the present invention.

Alignment computer 22 is also coupled to pattern generator 24 that generates a video signal that is transmitted to universal monitor board 44 via connector 35. Universal monitor board 44 generates driver signals 186 that are applied to the cathode ray tube 10 to generate a video image. Universal monitor board 44 also stores correction factor data or parametric data in characterization module 72 via connector 74 that is used for later alignment of cathode ray tube 10.

Universal monitor board 44 can also store correction factor data and parametric data on LAN 83 via LAN interface 81 and connector 79, or on a storage medium 80 via recorder 78 and connector 76. In this manner, such data can be made available for later use in aligning the cathode ray tube 10.

Figure 2:
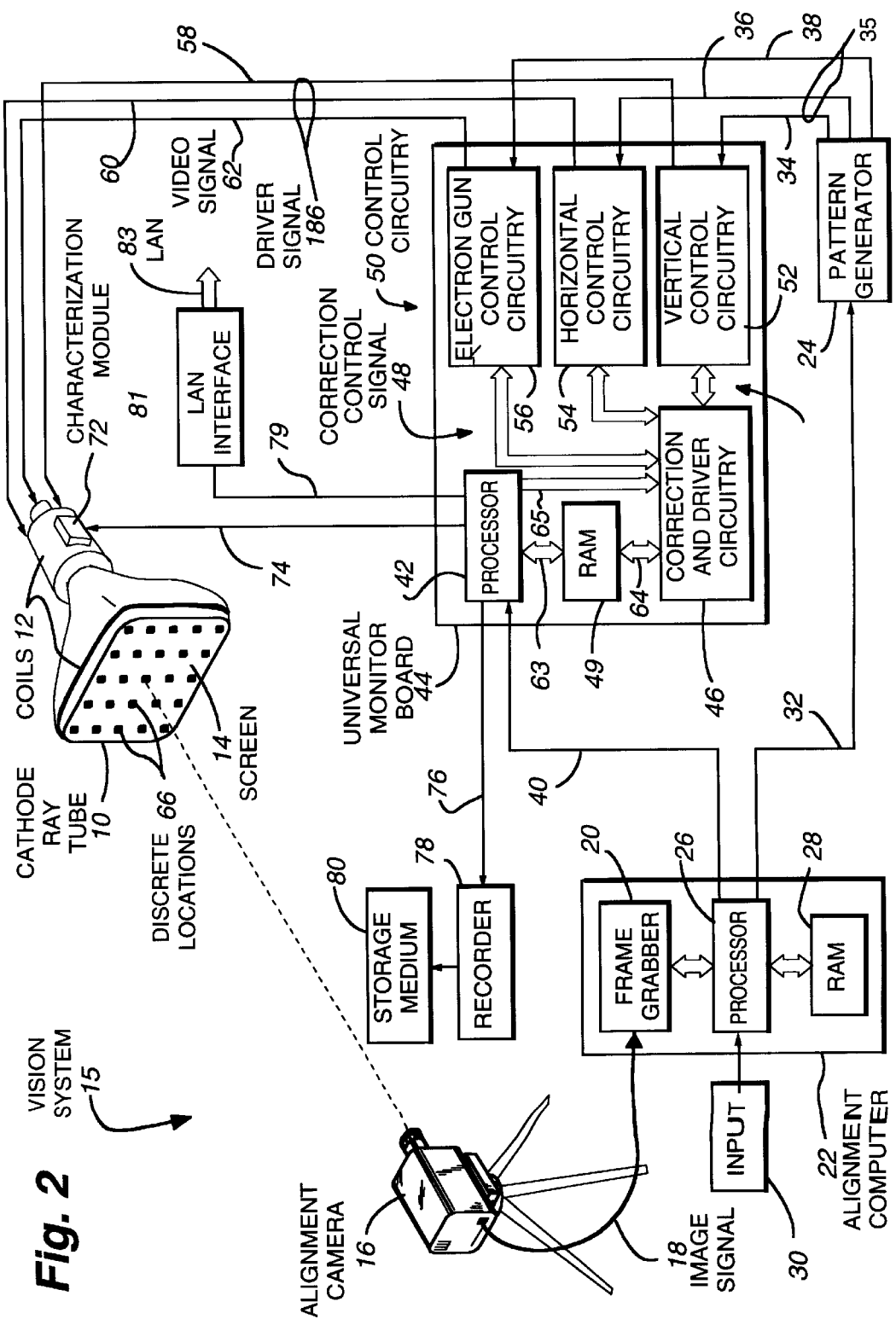
FIG. 2 is a schematic diagram of the system of FIG. 1 shown in more detail.

The system of FIG. 2 can be used for generating correction factor data that can be used to align a cathode ray tube. As shown in FIG. 2, alignment camera 16 of vision system 15 is focused and directed at the screen face 14 of cathode ray tube 10 to generate an image signal 18 that is applied to frame grabber 20 that forms a part of the alignment computer 22, which is more fully described U.S. Pat. No. 5,216,504 and U.S. patent application Ser. No. 08/617,322 filed Mar. 18, 1996 now U.S. Pat. No. 5,697,079 issued Aug. 12, 1997 by Thario et al entitled "Correction for Monitor Refraction Using Empirically Derived Data", which is specifically incorporated herein by reference for all that it discloses and teaches. Frame grabber 20 captures a single frame of the image signal 18 generated by alignment camera 16 that is representative of the image generated on screen 14. In this case, the image generated on screen 14 comprises a video pattern generated by pattern generator 24. Frame grabber 20 captures the single frame in response to a signal from processor 26 that forms part of alignment computer 22. Processor 26 is coupled to RAM 28 which functions to control the operation of processor 26. Input device 30 is coupled to the processor 26 to provide input data and control data for processor 26. Input device 30 can comprise any desired type of input device including a keyboard that is coupled to an I/O device that forms part of the processor 26. Processor 26 is coupled to an output 32 that controls pattern generator 24 so that a pattern is generated at the outputs 34, 36, and 38 of pattern generator 24. Processor 26 also has an output 40 that is coupled to processor 42 of universal monitor board 44. Output 40 transmits correction factor data to processor 42 which processor 42, in turn, loads into the proper decoders of correction and driver circuitry 46. RAM 49 stores data for the operation of processor 42, so that processor 42, for example, can transfer the correction factor data to the proper decoder in the correction and driver circuitry 46. The output of correction and driver circuitry 46 comprises correction control signals 48 that are applied to control circuitry 50. Control circuitry 50 comprises vertical control circuitry 52, that controls the amplitude and gain of vertical driver signal 58 that affects vertical deflections and geometries, horizontal control circuitry 54, that controls the amplitude and gain of horizontal driver signal 60 that affects horizontal deflections and geometries, and electron gun control circuitry 56 that controls the amplitude and gain of the video signal 62 that is applied to the electron guns.

As mentioned above, pattern generator 24 produces a video pattern signal on outputs 34, 36, 38 that are applied to vertical control circuitry 52, horizontal control circuitry 54, and electron gun control circuitry 56, respectively. The vertical driver signal 58 of vertical control circuitry 52 and the horizontal driver signal 60 of horizontal control circuitry 54 are applied to the various deflection and control windings (coils) 12 that are positioned around the cathode ray tube 10.

Coils 12 cause the electron beam generated by the electron guns (not shown) to be deflected, focused, etc., for display on the cathode ray tube screen 14. Electron gun control circuitry 56 generates a video signal output 62 that is applied to the electron guns that adjusts the bias and drive for the electron guns.

The correction factor data that is transmitted via connector 40 to processor 42 is processed by processor 42 and applied to the correction and driver circuitry 46 via connectors 65. Alternatively, a dual port RAM can be used as RAM 49 so that correction factor data can be transmitted directly to correction and driver circuitry 46 via connectors 64. In that case, connectors 63 provide address data to RAM 49 to read the correction factor data from RAM 49. Correction factor data can also be transmitted from RAM 49 to processor 42 via connectors 63. Correction and driver circuitry 46 functions to decode correction factor data received over connectors 64 and 65 and generate a series of analog signals that are correlated to produce correction control signals 48 for application to control circuitry 50.

In operation, when the system of FIG. 2 is configured to generate correction factor data in a production operation, alignment camera 16 generates an image signal 18 that is representative of the video pattern produced on screen 14 by pattern generator 24. The image signal 18 is captured in frame grabber 20 and processed by processor 26. Processor 26 measures the distortion of the video pattern in the manner described in U.S. Pat. No. 5,216,504. For example, processor 26 may employ edge detection techniques to locate the edge of a captured pattern image and measure the distance of the video pattern from the edge of the screen bezel or shadow mask. From this amount of measured distortion, correction factor data can be calculated by processor 26 to correct the measured amount of distortion. Processor 26 also uses a gain matrix table that defines the interrelationship of various correction factor parameters, so that when a correction is made for one correction factor parameter, such as, for example, horizontal pincushioning, the effect on horizontal size is also determined. The gain matrix table is stored in the characterization module 72 or other storage medium 80.

The alignment computer 22 of FIG. 2, as disclosed below, functions in a manner somewhat different from the alignment computer disclosed in the vision system of U.S. Pat. No. 5,216,504, in that the distortion data at a series of discrete locations 66 on screen 14 is measured and correction factor data is generated for each of those discrete locations 66 for each correction factor parameter, as disclosed below.

The alignment camera 16 of vision system 15 illustrated in FIG. 2 generates an image signal 18 that allows for the measurement of detailed distortion data. Once the correction factor data is calculated by processor 26 from the measured distortion data, the correction factor data is communicated to micro-processor 42 to generate a new pattern on screen 14 by modification of the correction control signals 48 that are applied to control circuitry 50. Vision system 15 then repeats the process of generating correction factor data if the new video pattern has distortion characteristics that exceed the alignment specifications of the vision system 15. Because the alignment computer 22 uses a gain matrix table that is stored in RAM 28, the number of iterations to achieve alignment of the video image on cathode ray tube 10 is reduced.

Once a set of correction factor data is generated by the system of FIG. 2 that causes the video signal 62 to be aligned within certain alignment specifications on screen 14, as detected by vision system 15, the processor 42 transmits the correction factor data to a characterization module 72 that is coupled to the cathode ray tube 10. The characterization module 72 may contain a number of different devices for storing the correction factor data, as disclosed below.

Alternatively, the correction factor data can be transmitted via connector 76 to a recorder 78 that functions to record the correction factor data on some storage medium 80. The storage medium can comprise any desired storage medium such as magnetic strips, bar codes, or other storage media that can be attached to or shipped with the cathode tube ray 10. As another alternative, processor 42 can store the correction factor data on a LAN interface device 81 that is connected to a local area network 83 that provides the correction factor data for use at a different location. For example, correction factor data may be stored on a server connected to LAN 83 and accessed over LAN 83 for storage in memory in a monitor when the cathode ray tube 10 is being placed in the monitor. LAN 83 may also be coupled to a wide area network (WAN) (not shown), the Internet or other communications link, for access at remote locations, such as when the cathode ray tube manufacturer and the monitor manufacturer are not proximately located. This information can be downloaded for storage in the monitor by the monitor manufacturer, a service technician or end user.

Hence, the system illustrated in FIG. 2 can be used to generate correction factor data for a series of correction factor parameters to characterize the distortion characteristics of the cathode ray tube 10. The correction factor data can then be stored in the characterization module 72, in storage medium 80, which is either coupled to, or shipped with, the cathode ray tube 10, or coupled to a LAN 83. As disclosed below, the correction factor data is used to align the cathode ray tube 10 when the cathode ray tube 10 is installed in a monitor, such as a computer monitor or television. The system of FIG. 2 can also be used in the manner disclosed in U.S. Pat. No. 5,216,504 to generate parametric data that is used as part of transformation equations that produce correction waveforms to correct distortions. So, the system of FIG. 1 can be designed to generate different forms of data for storage including parametric data and correction factor data, depending upon the correction and driver circuitry used in the monitor.

Figure 3A:
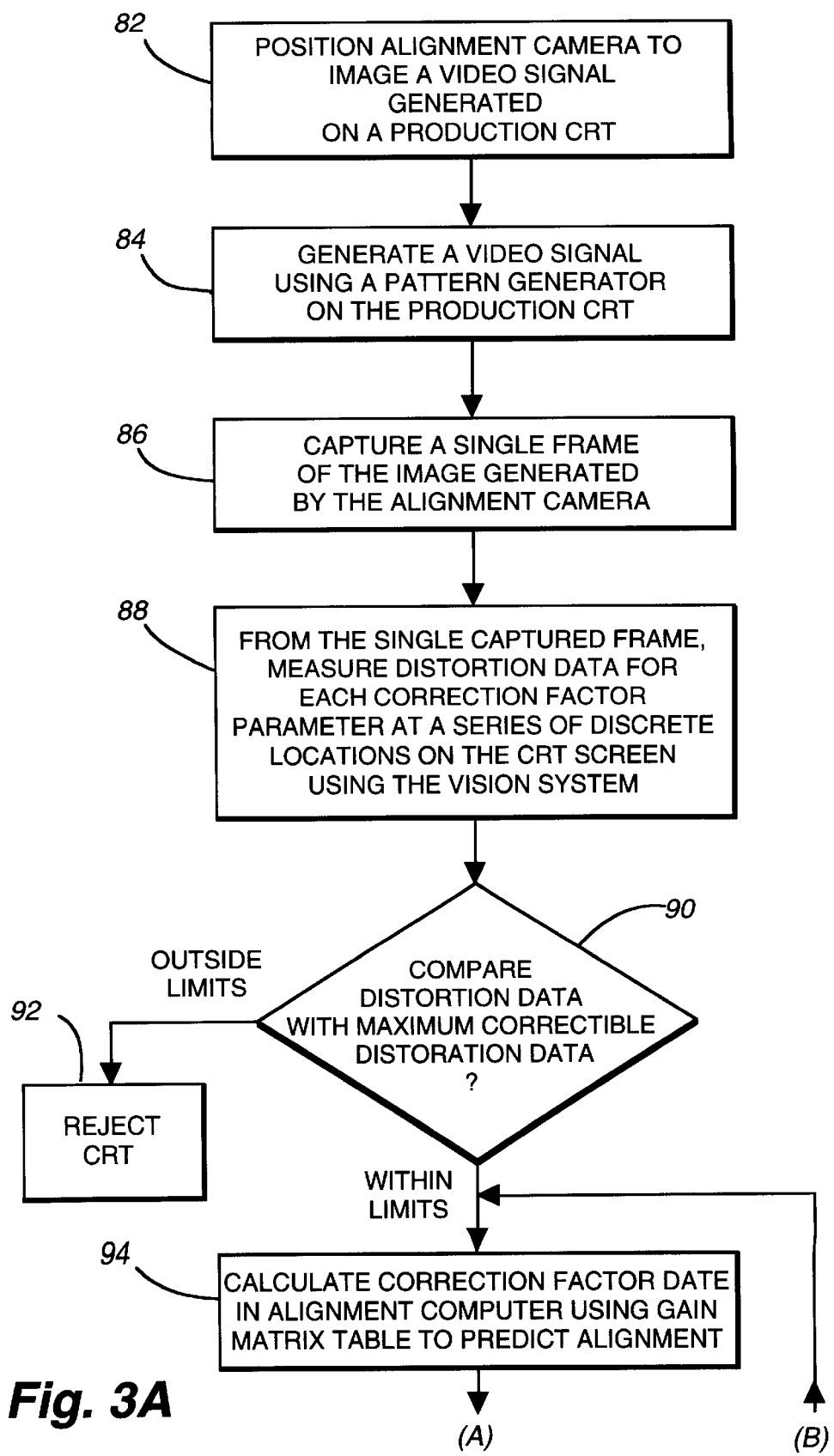
FIGS. 3A and 3B illustrate a schematic flow diagram illustrating the manner in which correction factor data is generated and stored with a production cathode ray tube.
Figure 3B:
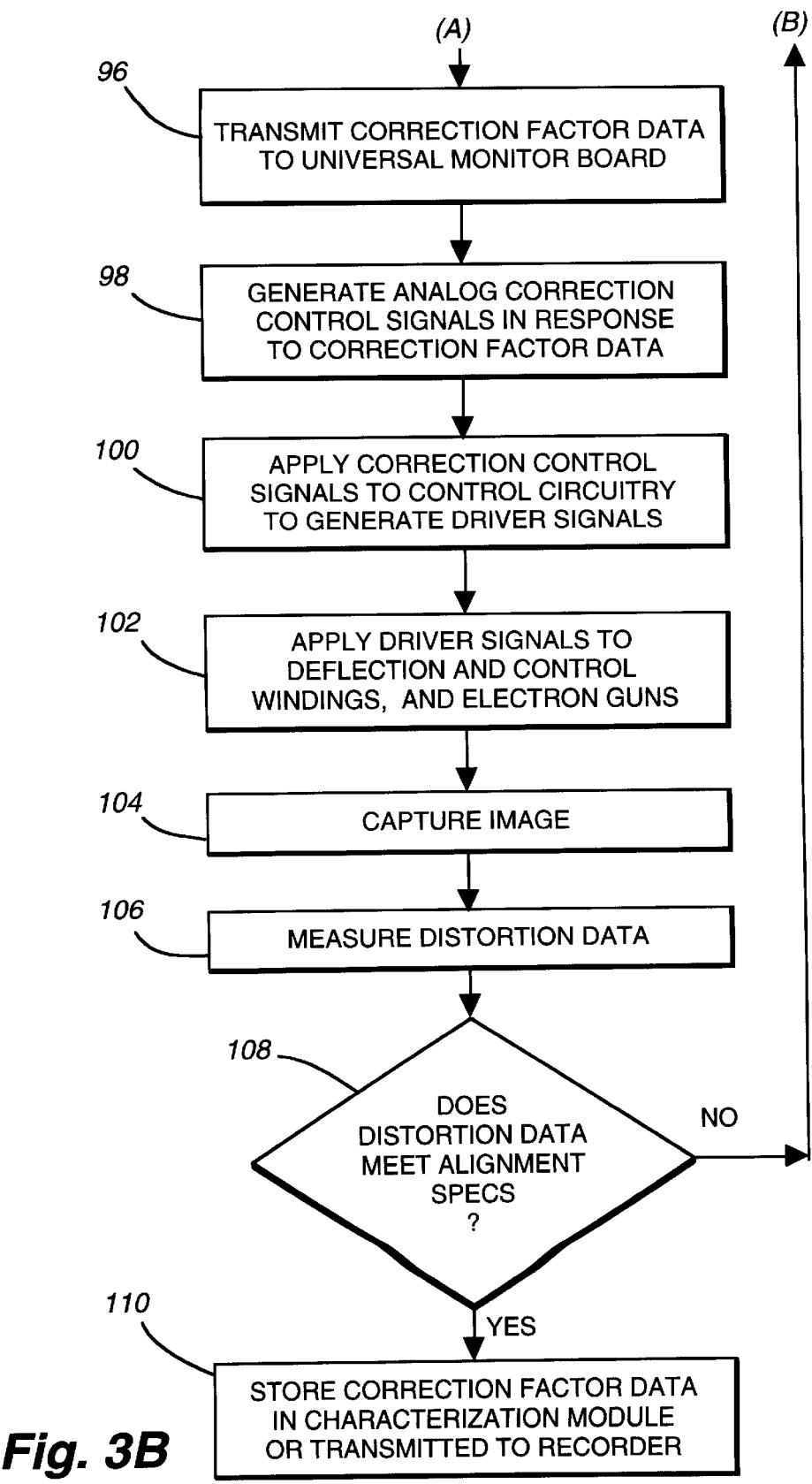

FIGS. 3A and 3B disclose a schematic flow diagram of the functions performed by the vision system 15 and universal monitor board 44 to generate correction factor data, as described above. At step 82, the alignment camera 16 is positioned in front of the cathode ray tube screen 14 to image the video pattern generated by video signal 62 from pattern generator 24. Cathode ray tube 10 may comprise a production cathode ray tube on a production line for which correction factor data is being generated at a series of discrete locations 66. The correction factor data is then stored with the cathode ray tube 10. At step 84, a video signal 62 is generated by pattern generator 24 on the production CRT 10. At step 86, a single frame of image signal 18 is captured by frame grabber 20. At step 88, distortion data is measured for each correction factor parameter at a series of discrete locations 66 on the cathode ray tube screen using the alignment computer 22. The number of discrete locations can, of course, vary for each particular correction factor parameter rather than simply having the 25 discrete points illustrated in FIG. 2 for each correction factor parameter. The distortion data can take the form of physical measurements, or encoded data representative of the physical measurements of the distortion characteristics.

Figure 4:
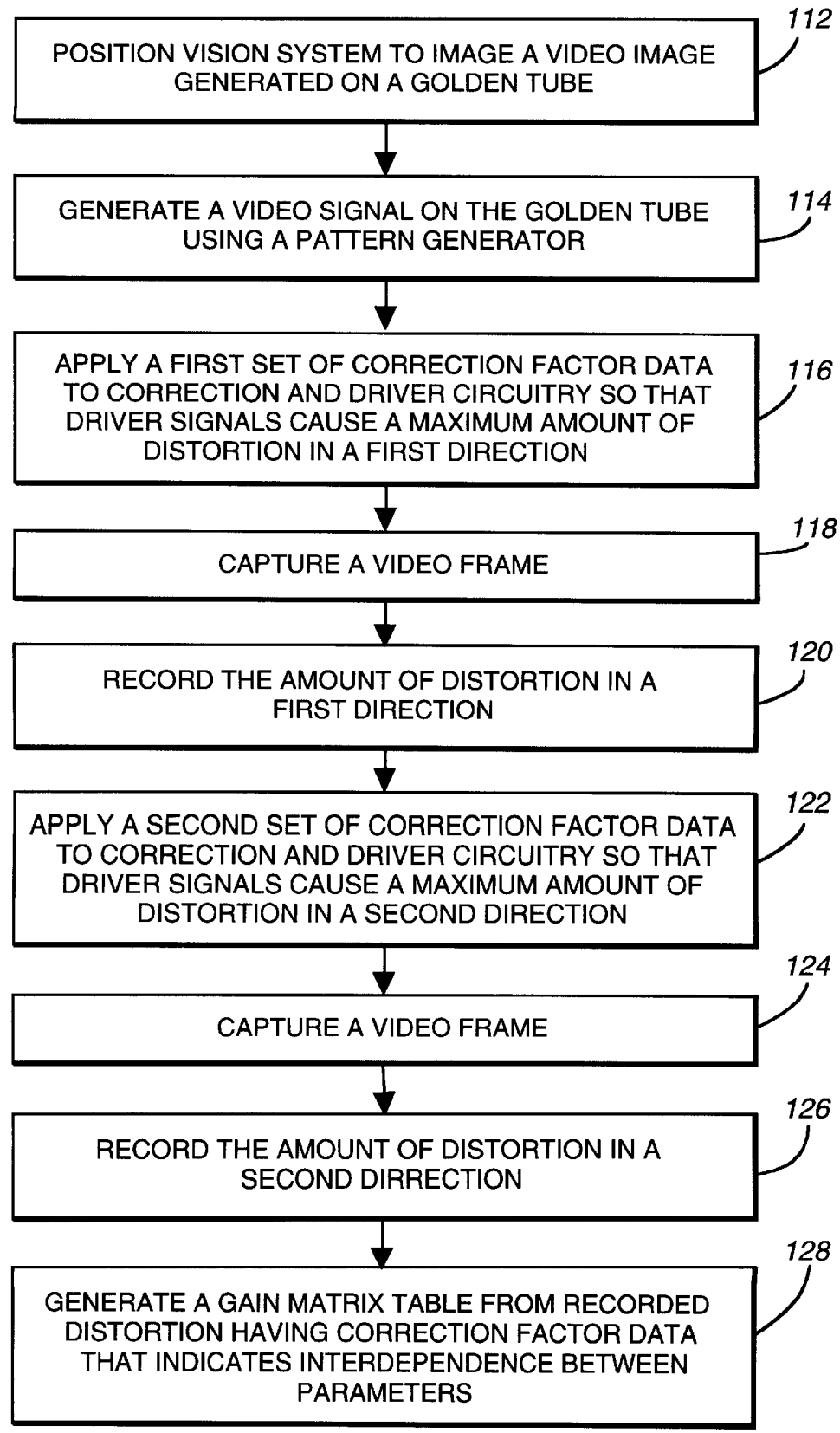
FIG. 4 is a schematic flow diagram illustrating the manner in which the vision system illustrated in FIG. 1 generates maximum correctable distortion data from a golden tube.

Once the distortion data is measured, it is then compared, at step 90, with the maximum correctable distortion data generated in accordance with flow diagram illustrated in FIG. 4. If the distortion data is outside of the limits of the maximum correctable distortion data, the cathode ray tube 10 is rejected at step 92.

If the measured distortion data for the cathode ray tube 10 falls within the limits of the maximum correctable distortion data, the alignment computer 22 calculates the correction factor data using a gain matrix table to predict the proper values for the correction factor data to produce alignment at step 94. At step 96, the correction factor data is transmitted from the alignment computer 22 to the universal monitor board 44. At step 98, the correction and driver circuitry 46 generates analog correction control signals in response to the correction factor data as disclosed in FIG. 5.

At step 100 of FIGS. 3A and 3B, the correction control signals 48 are applied to the control circuitry to generate the driver signals. At step 102, the driver signals are applied to the deflection and control windings and to the electron guns to modify the image produced on screen 14. At step 104, the new image is viewed by the alignment camera 16, which generates an image signal 18 that is applied to frame grabber 20, which in turn, captures the new image. At step 106, the alignment computer measures the distortion data for the modified image. At step 108, the alignment computer 22 determines whether the distortion data of the modified image meets the alignment specifications. The alignment specifications can comprise any desired set of specifications indicating the amount of allowable distortion to produce a cathode ray tube that is considered to be adequately aligned. If the distortion data does not meet the alignment specifications of the cathode ray tube, new correction factor data is calculated at step 94 and the process is repeated. If the distortion data of the modified image does meet the alignment specifications, the correction factor data is stored in the characterization module 72 or, alternatively, transmitted to recorder 78 for storage on storage medium 80, at step 110.

As mentioned above, the system illustrated in FIG. 2 can also be used for generating the maximum correctable distortion data in a golden tube. As illustrated in FIG. 4, at step 112, the vision system 15 is positioned to image a video pattern generated on the golden tube 10. Golden tube 10 is a cathode ray tube having distortion characteristics that fall within the range of average distortions for other cathode ray tubes of the same make and model. At step 114, pattern generator 24 generates a video pattern on the golden tube 10. At step 116, alignment computer 22 generates a first set of correction factor data on output 40 to produce driver signals 186 (FIG. 5) that cause a maximum amount of distortion in a first direction. For example, if the correction factor data for any particular correction factor parameter has a range of zero to 255, the maximum amount of distortion in a first direction may be caused by a correction factor data signal of 255. Similarly, correction factor data to cause a maximum amount of distortion in a second direction, in this example, may be zero. At step 118, a single video frame is captured by frame grabber 20. This procedure may be performed for a single correction factor parameter at a time or multiple correction factor parameters, depending upon the interaction of such correction factor parameters. At step 120, alignment computer 22 then records the amount of distortion (distortion data) caused by the correction factor data that is maximized in a first direction. At step 122, alignment computer 22 applies a second set of correction factor data, via output, 40, to universal monitor board 44, so that driver signals 186 (FIG. 5) cause a maximum amount of deflection in a second direction. At step 124, the image is captured by frame grabber 20 and the amount of distortion in a second direction is recorded at step 126. At step 128, a gain matrix table is also generated by the alignment computer 22 and stored in RAM 28 by detecting the dependence between correction factor data for different correction factor parameters. In this manner, the flow diagram of FIG. 4 illustrates the manner in which the limits of the distortion data (maximum correctable distortion data) can be generated using the system of FIG. 2, and recorded in the alignment computer 22.

Figure 5:
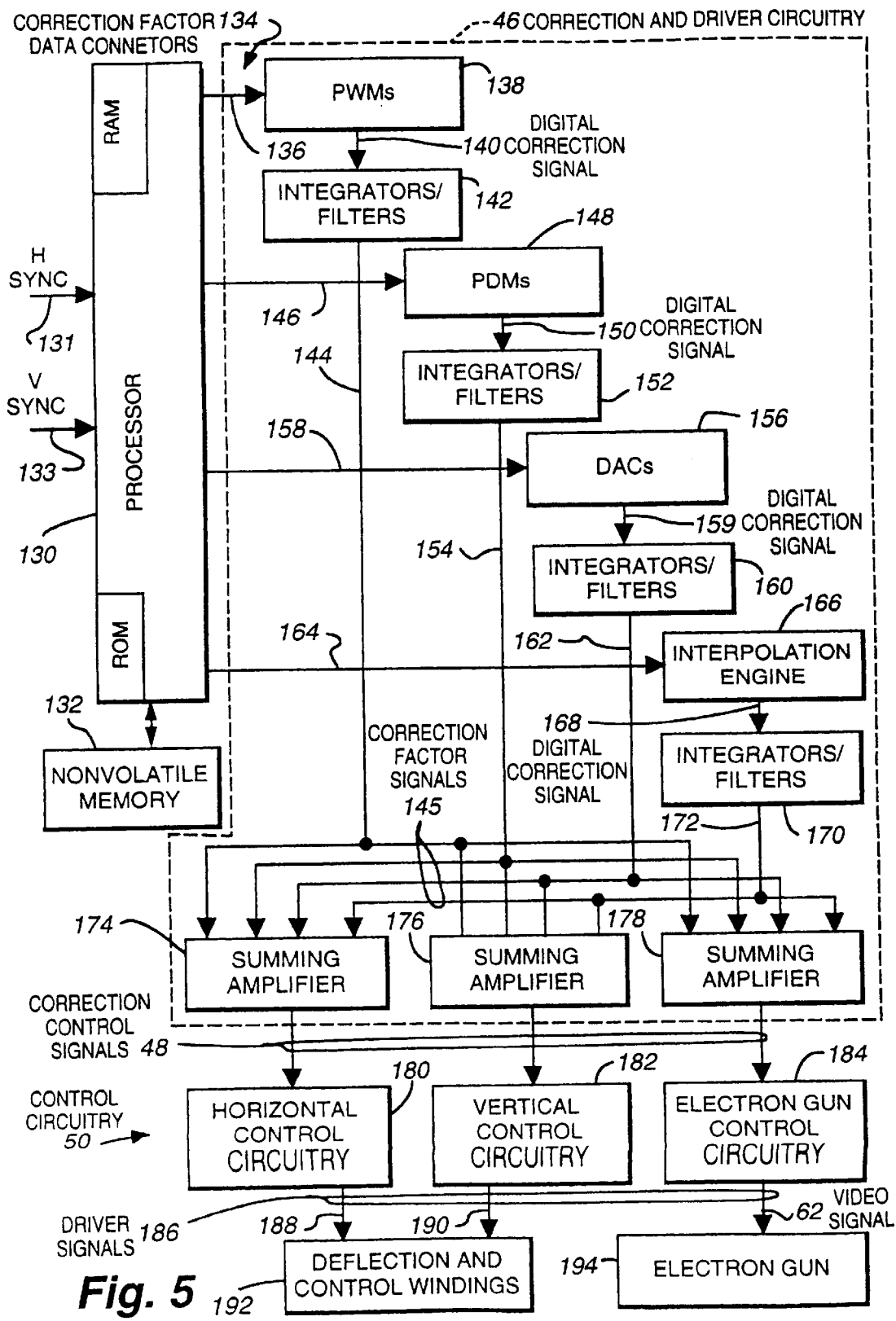
FIG. 5 is a schematic block diagram illustrating the various components that can be used in a monitor to align a video signal using correction factor data stored with the cathode ray tube monitor.

FIG. 5 is a schematic block diagram that illustrates the components of the correction and driver circuitry 46 that can be employed in a universal monitor board 44, or in a monitor that uses correction factor data to align cathode ray tubes 210. As shown in FIG. 5, processor 130 is coupled to nonvolatile EEPROM 132 which stores the correction factor data generated by the system illustrated in FIG. 2. Processor 130 includes ROM and RAM, as illustrated in FIG. 5, that store program data for operation of processor 130. The nonvolatile memory 132, processor 130, and correction and driver circuitry 46 can comprise components of characterization module 72, illustrated in FIG. 2, or, various portions of these components can be supplied with the monitor chassis, as disclosed below. Processor 130 functions to address and transmit the correction factor data stored in nonvolatile memory 132 to various components in the correction and driver circuitry 46 at the proper time via correction factor data connectors 134. Proper timing is provided by horizontal sync signal 131 and vertical sync signal 133. As shown in FIG. 5, connector 136 couples correction factor data to pulse width modulator 138. Pulse width modulator 138 decodes the correction factor data that may take the form of, for example, an 8 bit byte that is representative of the width of a pulse to be generated by the correction and driver circuitry 46. Pulse width modulator 138 generates digital correction signal 140 that comprises a digital signal having a width that is representative of the encoded correction factor data applied by micro-processor 130. Pulse width modulators are more fully disclosed in U.S. Pat. No. 5,216,504 and U.S. patent application Ser. No. 08/611,098 filed Mar. 5, 1996 that is cited above. Processor 130 can take any desired form of logic processing device for transmitting the correction factor data from nonvolatile memory 132 to the proper decoder in the correction and driver circuitry 46 at the proper time, including state machines or simple logic devices including serial EEPROMs, such as an Atmel AT24C01A having 128-8 bit bytes. Digital correction signal 140 generated by the pulse width modulator 138 is applied to integrator/filter 142 that either integrates or filters the digital correction signal 140 and provides an analog correction factor signal 144.

Processor 130 also transmits correction factor data stored in nonvolatile memory 132 to pulse density modulator 148 via connector 146. Pulse density modulars are more fully disclosed in U.S. patent application Ser. No. 08/258,393, filed Jun. 13, 1994 now U.S. Pat. No. 5,504,521 issued Apr.

2, 1996, by James R. Webb et al, entitled "Method and Apparatus for Making Corrections in a Video Monitor During Horizontal Scan", and U.S. patent application Ser. No. 08/613,902, filed Mar. 11, 1996, U.S. Pat. No. 5,739, 870, by Ron C. Simpson, entitled "Interpolation Engine for Generating Gradients", both of which are specifically incorporated herein by reference for all that they disclose and teach, and U.S. patent application Ser. No. 08/611,098, filed Mar. 5, 1996 by James R. Webb, entitled "Method and Apparatus for Making Corrections in a Video Monitor" that is incorporated by reference above. Pulse density modulator 148 also decodes the correction factor data and generates a pulse density signal that is indicative of the correction to be provided as represented by the correction factor data signal input 146. The pulse density signal generated by pulse density modulator 148 comprises the digital correction signal 150 that is transmitted to integrators/filters 152 that integrate or filter the digital correction signal 150 to produce an analog correction factor signal 154. Processor 130 also transmits correction factor data from nonvolatile memory 132 to digital to analog converter 156 via connector 158. The digital to analog converter 156 can comprise any device that is capable of reading one or more bytes of encoded correction factor data and generating a digital correction signal 159 that is applied to integrator filters 160. Integrator/filters 160 integrate or filter the digital correction signal 159 to produce an analog correction factor signal 162. Digital to analog converter 156 essentially functions as a decoder for decoding the correction factor data bytes and generating a digitized correction signal 159.

As also shown in FIG. 5, processor 130 transmits correction factor data from nonvolatile memory 132 via connector 164 to interpolation engine 166. Interpolation engine 166 is capable of generating a series of digital correction signals 168 that are applied to integrators/filters 170. The interpolation engine 166 is more fully disclosed in U.S. patent application Ser. No. 08/613,902, filed Mar. 11, 1996, U.S. Pat. No. 5,739,870, by Ron C. Simpson, entitled "Interpolation Engine for Generating Gradients" that has been incorporated by reference. The digital correction signals 168 from interpolation engine 166 are integrated or filtered, if necessary, by integrator/filters 170 to produce an analog correction factor signal 172.

Each of the correction factor signals 145 from the integrator/filters are applied to summing amplifiers 174, 176, 178. Various logic may be used including tri-state gates, etc. to combine the various outputs of integrator filters 142, 152, 160 and 170 in the proper manner. For example, enable lines (not shown) can be employed as part of input logic to summing amplifiers 174, 176, 178 that are activated by processor 130 so that the proper signals are added together in the summing amplifiers. Additionally, as disclosed in U.S. patent application Ser. No. 08/258,393 filed Jun. 13, 1994 by James R. Webb entitled "Method and Apparatus for Making Corrections in a Video Monitor During Horizontal Scan", summing amplifiers 174, 176, 178, weight the signals in the proper manner to provide the proper correction control signals 48 that are applied to control circuitry 50. Control circuitry 50 utilizes the analog correction control signals 48 to generate the proper driver signals 186. Horizontal control circuitry 180 conditions the correction control signals 48 to produce driver signal 188 to drive various horizontal deflection and control windings. Similarly, vertical control circuitry 182 conditions the correction control signals 48 to produce driver signal 190 to drive various vertical deflection and control windings 192. Electron gun control circuitry 184 conditions the correction control signal 48 to produce video signal 62 that is applied to electron guns 194 to drive the electron guns with the proper amplitude and gain.

The components illustrated in FIG. 5 comprise one manner of implementing a device for decoding correction factor data that is stored in the nonvolatile memory 132 and aligning a cathode ray tube monitor. Any number of different components could be used for implementing the device of FIG. 5. For example, any one or more of the decoder devices that includes the pulse width modulators 138, the pulse density modulators 148, the DACs 156 and the interpolation engine 166 could be eliminated. Moreover, any method of combining the correction factor signals and conditioning these signals to generate driver signals for the deflection and control windings 192 and electron guns 194 could be employed. Also, any one of the integrators/filters can be removed if appropriate.

Figure 6:
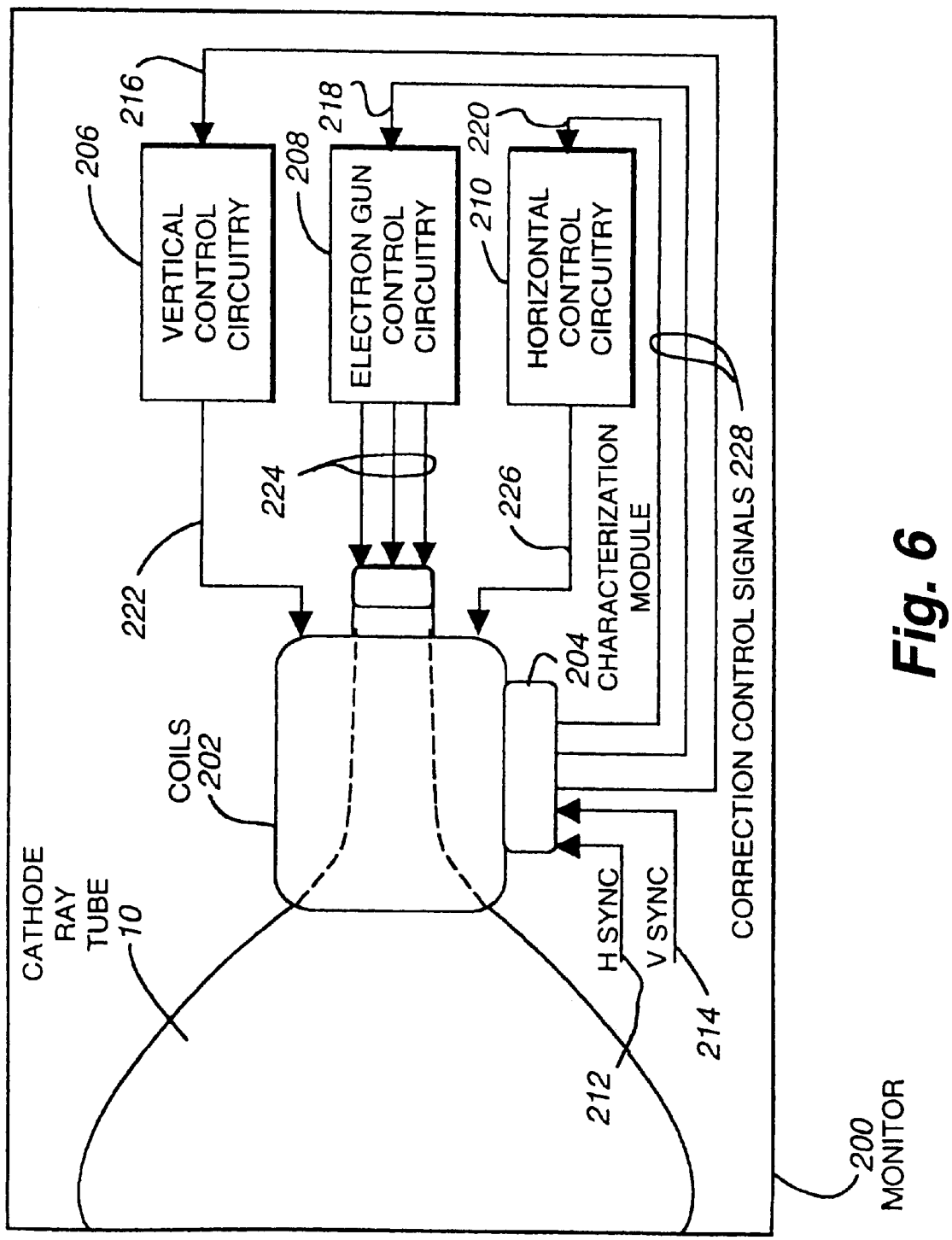
FIG. 6 is a schematic illustration of a monitor having a characterization module that includes a memory, a processor and correction and driver circuitry.

FIG. 6 is a schematic block diagram illustrating a monitor 200. The monitor 200 includes a cathode ray tube 10, a series of deflection and control windings illustrated by coils 202, a characterization module 204 coupled to coils 202, vertical control circuitry 206, electron gun control circuitry 208 and horizontal control circuitry 210. Horizontal sync signal 212 and vertical sync signal 214 are applied to characterization module 204. Characterization module 204 generates three outputs 216, 218, 220 that are applied to vertical control circuitry 206, electron gun control circuitry 208 and horizontal control circuitry 210, respectively. Vertical control circuitry 206 generates driver signals that are applied by connectors 222 to coils 202. Electron gun control circuitry 208 generates a video signal 224 that is applied to the electron guns of the cathode ray 210. Horizontal control circuitry 210 generates a driver signal that is coupled to coils 202 via connectors 226. Characterization module 204 can comprise a nonvolatile memory 132, a processor 130 and correction and driver circuitry 46, all of which are illustrated in FIG. 5.

In operation, the monitor 200 of FIG. 6 has correction factor data stored in a device such as an EEPROM in the characterization module 204. The characterization module produces correction factor signals 228 that are connected to the control circuitry via connectors 216, 218, 220. Horizontal sync signal 212 and vertical sync signal 214 provide the timing signals for transmission of the proper correction factor signals 226 to the control circuitry. The correction factor data stored in the characterization module 204 indicates the distortion characteristics of the particular cathode ray tube 10 that have been derived in a cathode ray tube production facility using a system such as illustrated in FIG. 2. The various components of the characterization module 204 read the correction factor data and generate correction control signals 228 that cause the control circuitry 206, 208, 210 to generate an aligned image on cathode ray tube 10. The manner in which this is performed is more fully disclosed in the flow diagram of FIG. 7.

Figure 7:
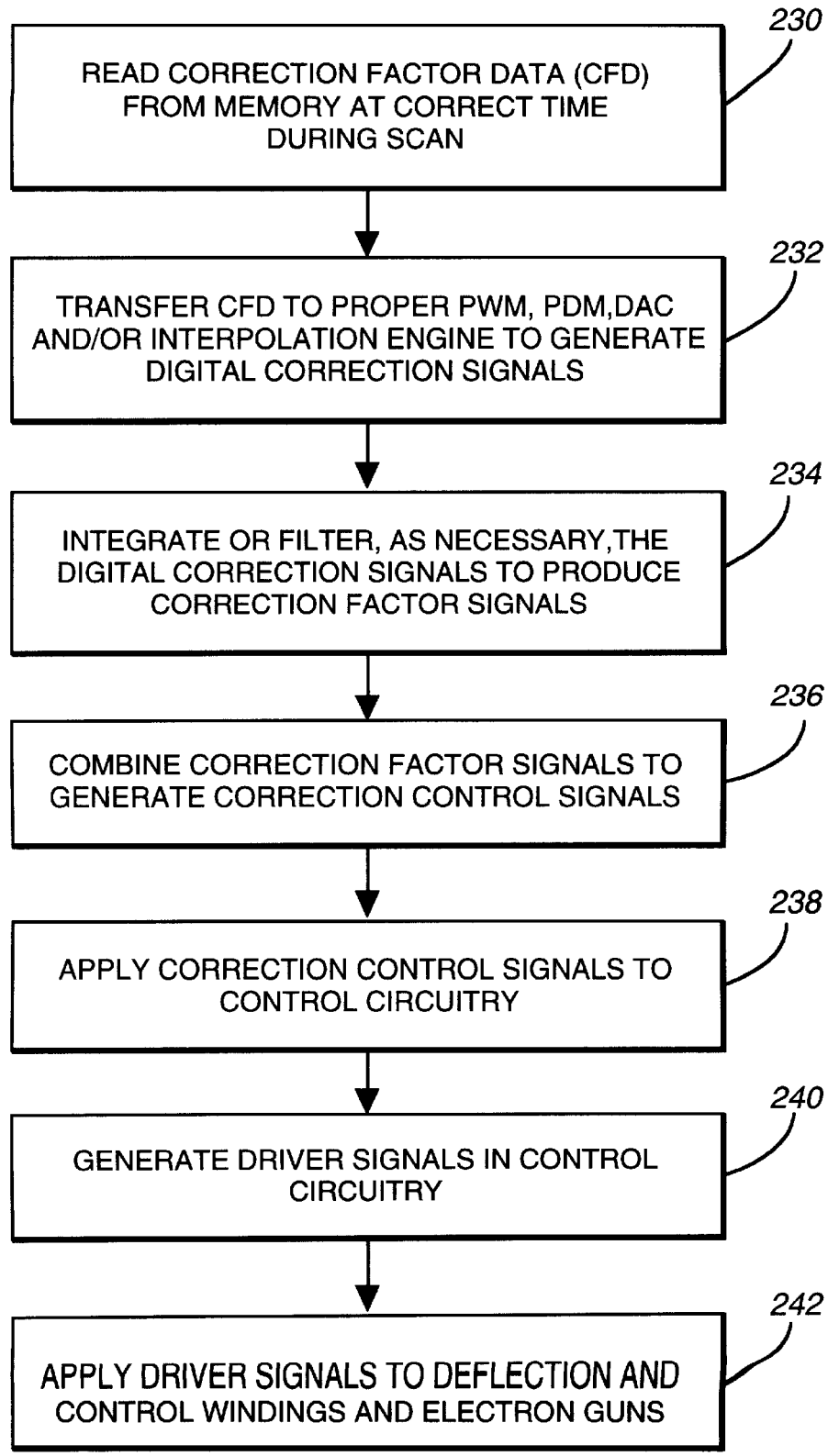
FIG. 7 is a schematic flow diagram illustrating the manner in which a monitor is aligned using correction factor data stored for later retrieval.

FIG. 7 is a flow diagram illustrating the manner in which the processor 130 (FIG. 5) that is included in characterization module 204 (FIG. 6) functions to read the correction factor data stored in nonvolatile memory 132 (FIG. 5) to generate an aligned video signal on cathode ray tube 210 (FIG. 6). Referring again to FIG. 7, processor 130 reads the correction factor data from nonvolatile memory 132 at the correct time during the scanning process at step 230. As mentioned above, the timing is determined by the horizontal sync signals 131 and vertical sync signals 133. At step 232, processor 130 transfers the correction factor data to the proper pulse width modulator, pulse density modulator, DAC and/or interpolation engine to generate the digital correction signals 140, 150, 159 and 168, respectively. At step 234, the various integrators/filters 142, 152, 160, 170 either integrate or filter the digital correction signals, if necessary, to produce the analog correction factor signals 145. At step 236, the correction factor signals 145 are combined to generate the correction control signals 48. At step 238, the correction control signals are applied to the control circuitry 50. At step 240, the correction signals 186 are generated in the control circuitry 50. At step 242, the driver signals 186 are applied to the deflection and control windings 192 and the electron guns 194.

Figure 8:
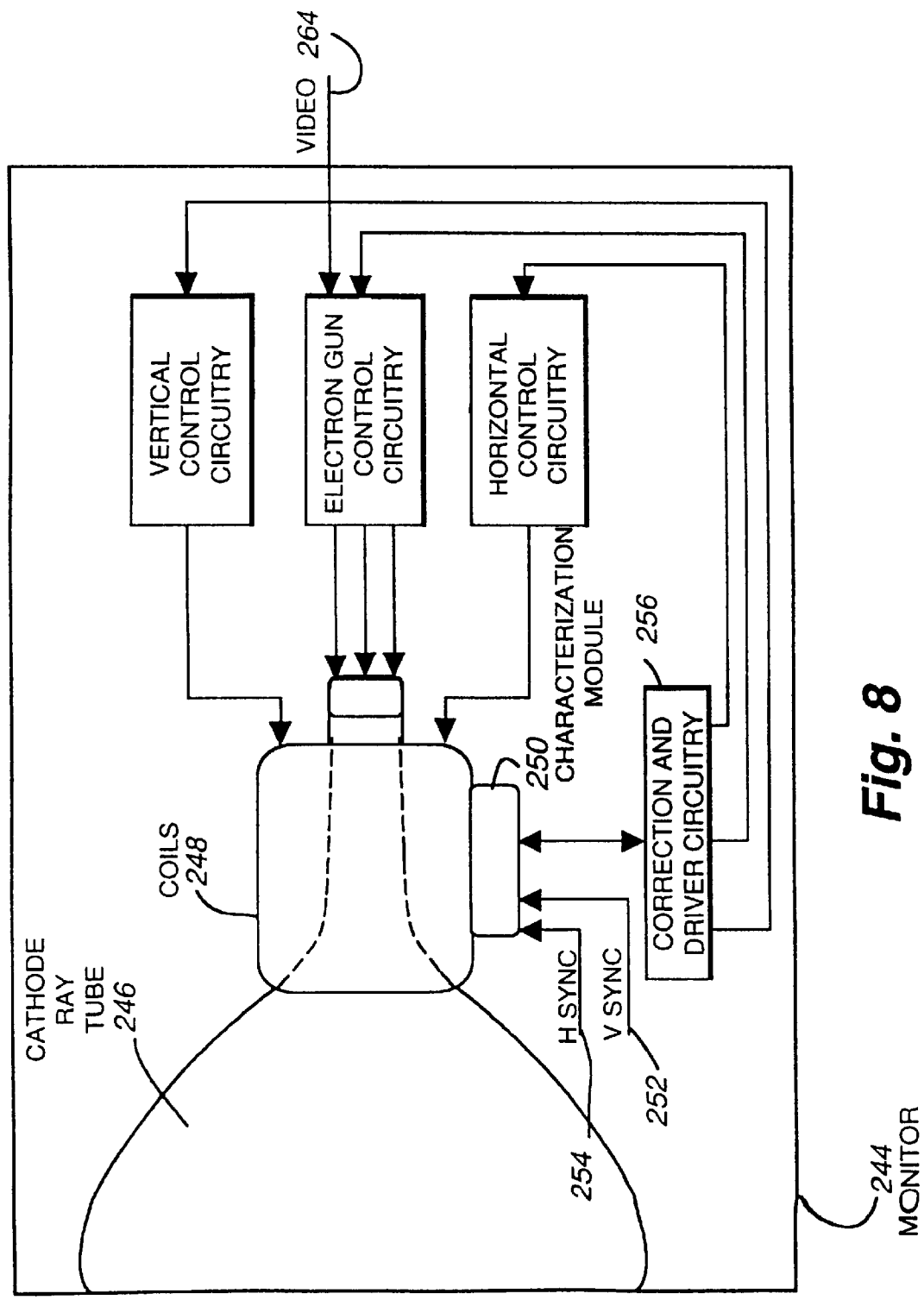
FIG. 8 is a schematic illustration of a monitor that includes correction and driver circuitry provided as part of a monitor chassis and a characterization module coupled to the cathode ray tube that includes a memory and a processor.

FIG. 8 is a schematic block diagram illustrating another configuration of a monitor 244. As shown in FIG. 8, monitor 244 has a cathode ray tube 246 that includes a series of deflection and control windings that are embodied in coils 248. Attached to coils 248 is a characterization module 250 that includes a logic circuit or logic chip and some form of nonvolatile electronic storage device such as an EEPROM, a EPROM, a PROM or ROM that stores the correction factor data that is representative of the distortion characteristics of the particular cathode ray tube 246. The vertical sync signal 252 and horizontal sync signal 254 are applied to the characterization module 250 to provide timing to the logic chip. The monitor 244 of FIG. 8 differs from the monitor 200 of FIG. 6 in that the correction and driver circuitry forms part of the chassis of the monitor 244. In the embodiment of FIG. 8, the characterization module 250 is therefore reduced in complexity and only contains a nonvolatile electronic storage device and a logic device. The logic device can comprise any number of different types of logic devices for transferring correction factor data to the correction and driver circuitry 256 at the proper time, as mentioned previously, including a micro-processor, state machine or a simple serial EEPROM. Also, correction and driver circuitry 256 can comprise circuitry that forms part of plug and play modules that are provided within monitors to provide the proper video signal 264 to monitor 244.

Figure 9:
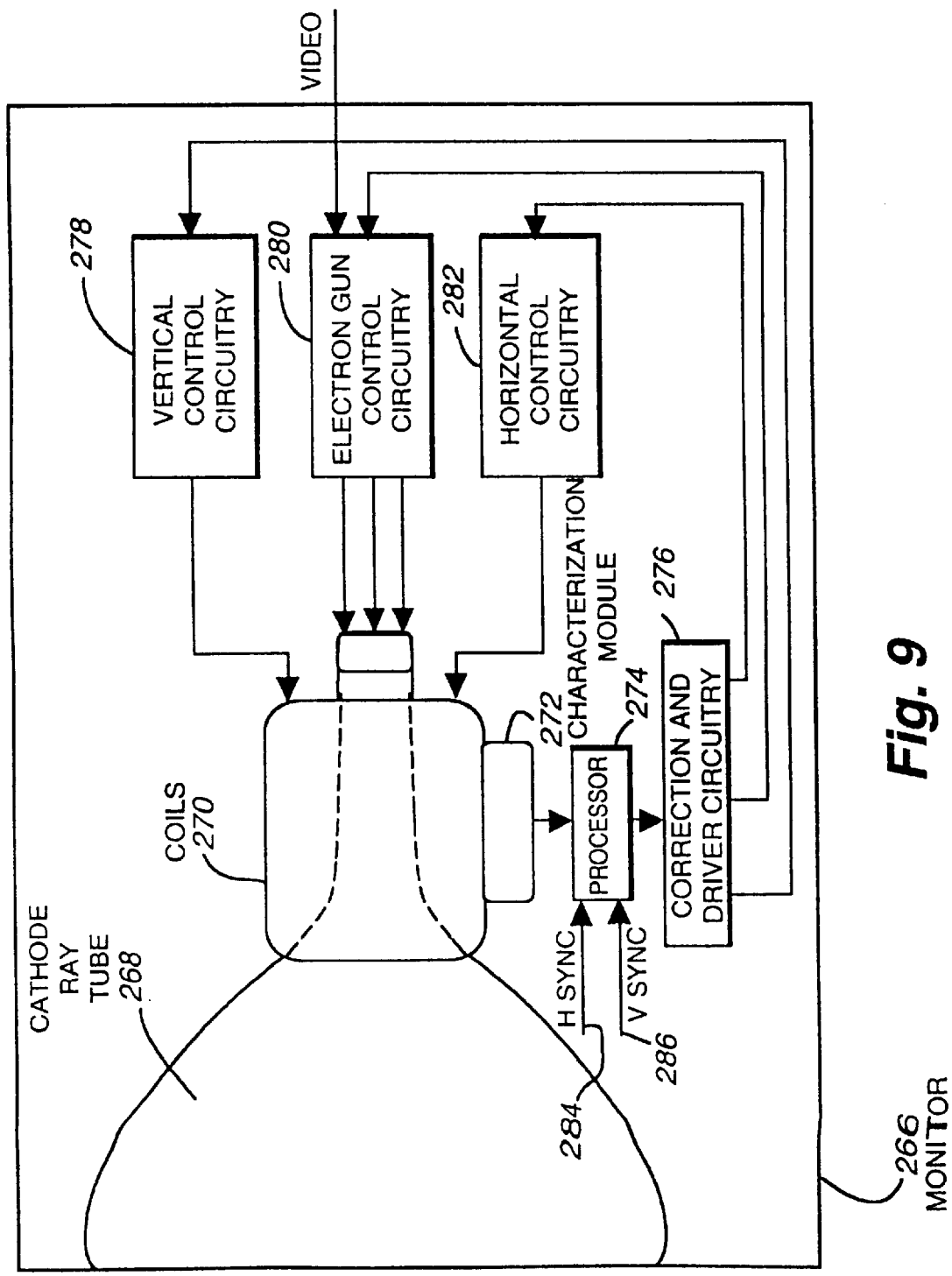
FIG. 9 is a schematic illustration of a monitor that includes a processor, and correction and driver circuitry that are provided as part of the monitor chassis and a characterization module coupled to the cathode ray tube that includes a memory.

FIG. 9 is a schematic block diagram of another embodiment of a monitor 266 that can be employed in accordance with the present invention. Monitor 266 includes a cathode ray tube 268 having coils 270 that comprise various deflection and control windings. A characterization module 272 is coupled to coils 270 in the same manner as described above. Characterization module 272, in the embodiment of FIG. 9, only comprises a memory device such as a nonvolatile electronic storage device, or other device for storing correction factor data. The embodiment of FIG. 9 differs from the embodiment of FIGS. 8 and 6 in that the chassis of monitor 266 includes processor 274 or other logic device, as described above, correction and driver circuitry 276, as well as vertical control circuitry 278, electron gun control circuitry 280 and horizontal control circuitry 282. Horizontal sync signals 284 and vertical sync signals 286 are applied to the processor 274 in the same manner as indicated in the other embodiments. Hence, in the embodiment of FIG. 9 the characterization module 272 consists of only a memory device. All of the other components are provided as part of the chassis of monitor 266.

Figure 10:
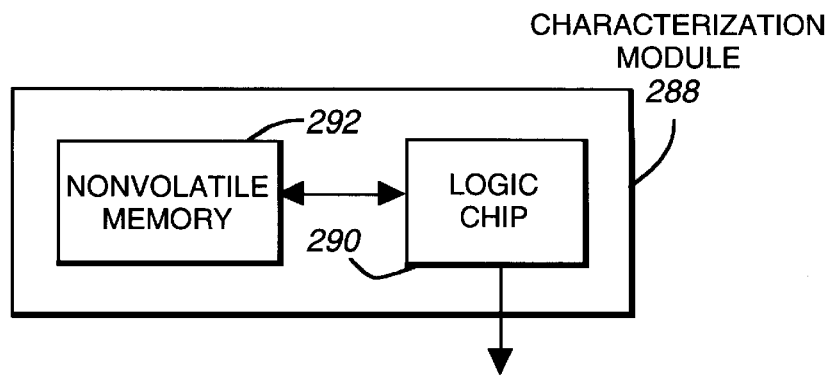
FIG. 10 is a schematic illustration of a characterization module that includes a logic chip and a nonvolatile memory device coupled to the logic chip.

FIG. 10 is a schematic illustration of a characterization module 288 that includes a logic chip 290 and some form of memory device 292. Again, the logic chip can take any form including a serial EEPROM, in which case memory 292 may not be required.

Figure 11:
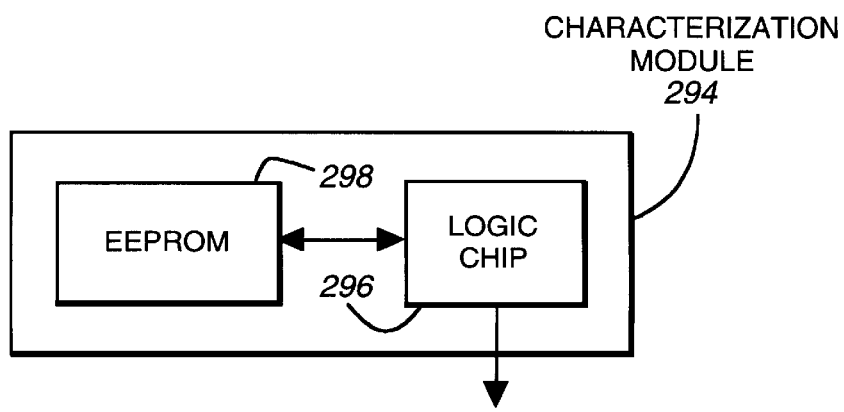
FIG. 11 is a schematic illustration of a characterization module that includes a logic chip and an EEPROM.

FIG. 11 is a schematic illustration of a characterization module 294 that includes a logic chip 296 and an EEPROM 298 that is used for storing correction factor data.

Figure 12:
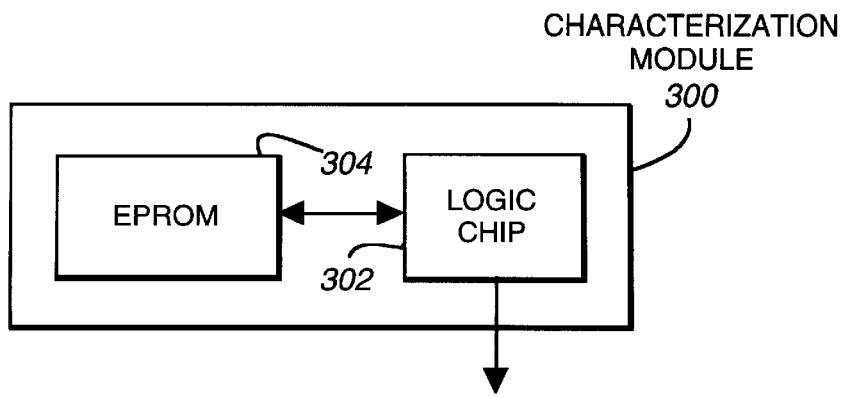
FIG. 12 is a schematic illustration of a characterization that includes a logic chip and an EPROM.

FIG. 12 is an illustration of another characterization module 300 that utilizes logic chip 302 and an EPROM 304.

Figure 13:
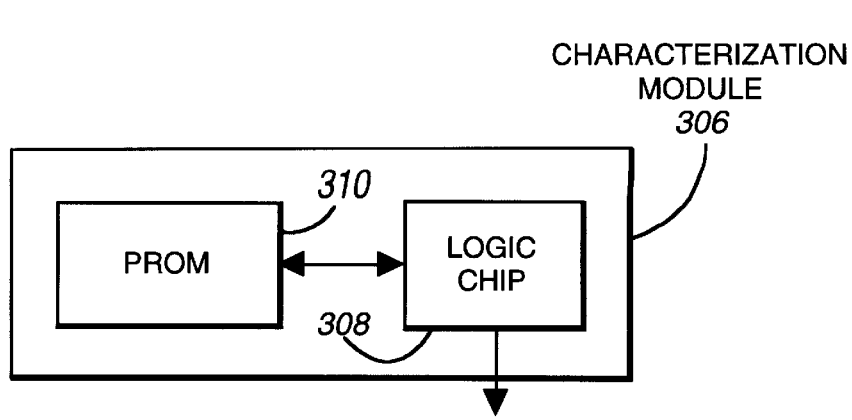
FIG. 13 is a schematic illustration of a characterization module that includes a logic chip and a PROM.

FIG. 13 is a schematic block diagram of a characterization module 306 that includes a logic chip 308 and a PROM 310 for storing the correction factor data.

Figure 14:
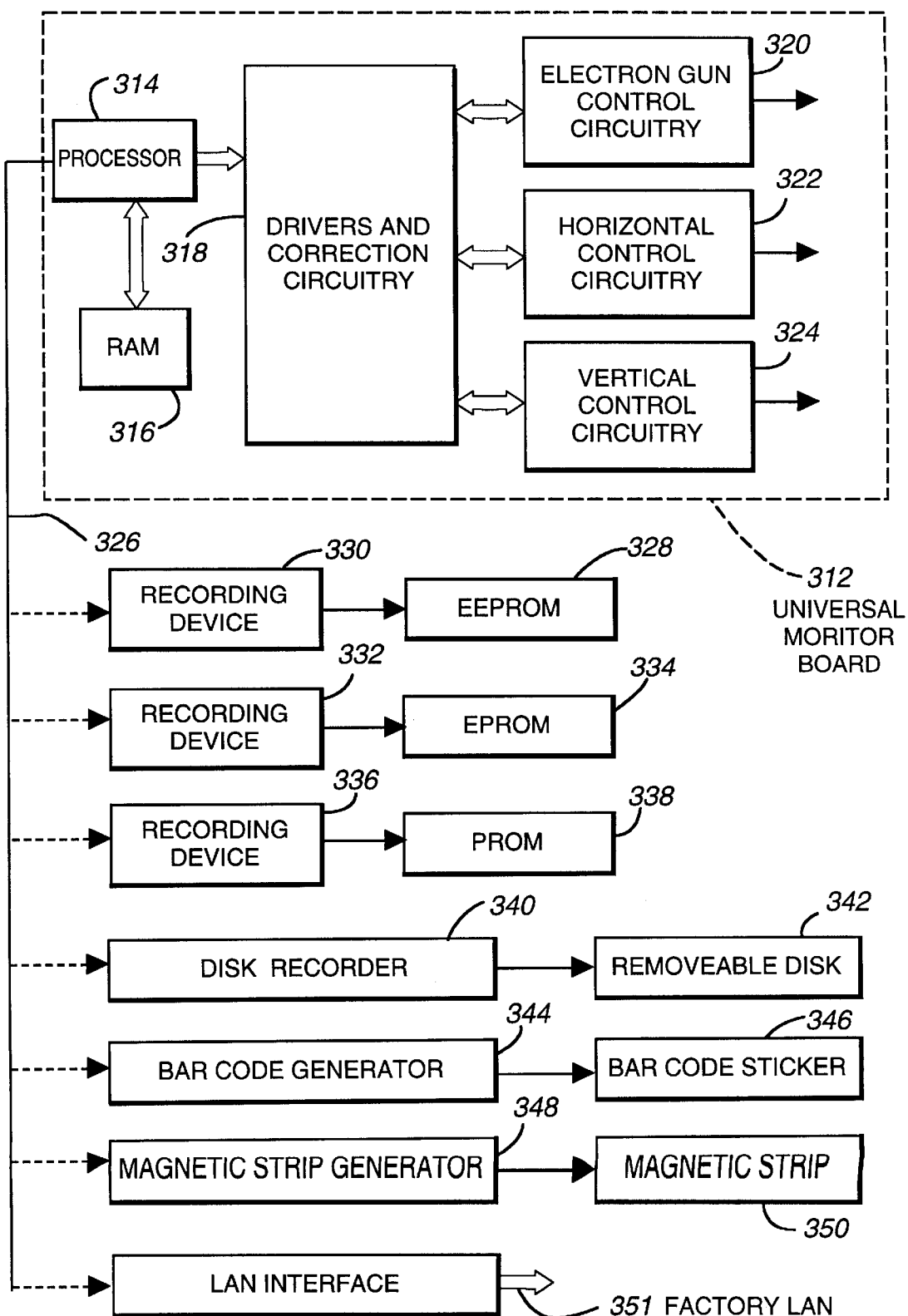
FIG. 14 is a schematic illustration of a universal monitor board and various types of memories and memory locations that can be used to store data with a cathode ray tube.

FIG. 14 is a schematic block diagram illustrating a universal monitor board 312 and various storage devices for storing the correction factor data to be included with the cathode ray tube monitor 10. As illustrated in FIG. 14, the universal monitor board 312 includes a processor 314, RAM 316, drivers and correction circuitry 318, electron gun control circuitry 320, horizontal control circuitry 322 and vertical control circuitry 324 in a configuration similar to the universal monitor board 44 in FIG. 2. The processor 314 is coupled to any one of a series of different storage devices via connector 326. For example, processor 314 can be coupled to a recording device 330 via connector 326 to store the correction factor data in EEPROM 328. Similarly, recording device 332 can be connected to connector 326 to store the correction factor data in an EPROM 334. Alternatively, recording device 336 can be coupled to connector 326 for recording the correction factor data in a PROM 338. Alternatively, a disk recorder 340 can be coupled to the connector 326 for recording the correction factor data on a removable disk 342 which can be shipped with the cathode ray tube. Such a disk may comprise a magnetic floppy disk, other magnetic storage media, a magneto-optical disk, a CD ROM, or any other desired storage device. In this instance, other software can be included with the disk 342, if desired, which can include test condition parameters relating to the universal monitor board. As also shown in FIG. 14, a bar code generator 344 can be coupled to connector 326 for generating a bar code sticker 346 that can be attached directly to the cathode ray tube 10. The bar code sticker can include the encoded correction factor data. Also, a magnetic strip generator 348 can be connected to connector 326 to generate a magnetic strip 350 that can store the correction factor data. The magnetic strip can then be attached directly to the cathode ray tube 10. Of course, other forms of storing the correction factor data could be utilized in accordance with the present invention so that the correction factor data is generated at the cathode ray tube production factory, where the cathode ray tube and coils are joined together and aligned, and provided with the cathode ray tube. Processor 314 can also be coupled to a local area network (LAN) 351 via a LAN interface 349. In this manner, correction factor data can be stored on a node on the LAN for use at a later time. For example, in a factory that is producing both cathode ray tubes and monitors, the correction factor data for the cathode ray tube can be placed on the factory LAN. When the cathode ray tube is then assembled in the monitor, the correction factor data can be read from the LAN and stored in the memory provided with the monitor. The monitor can then be activated using the correction factor data to provide alignment. A vision system can then be used with the monitor at that point to provide a final trim of the alignment, if desired.

Figure 15:
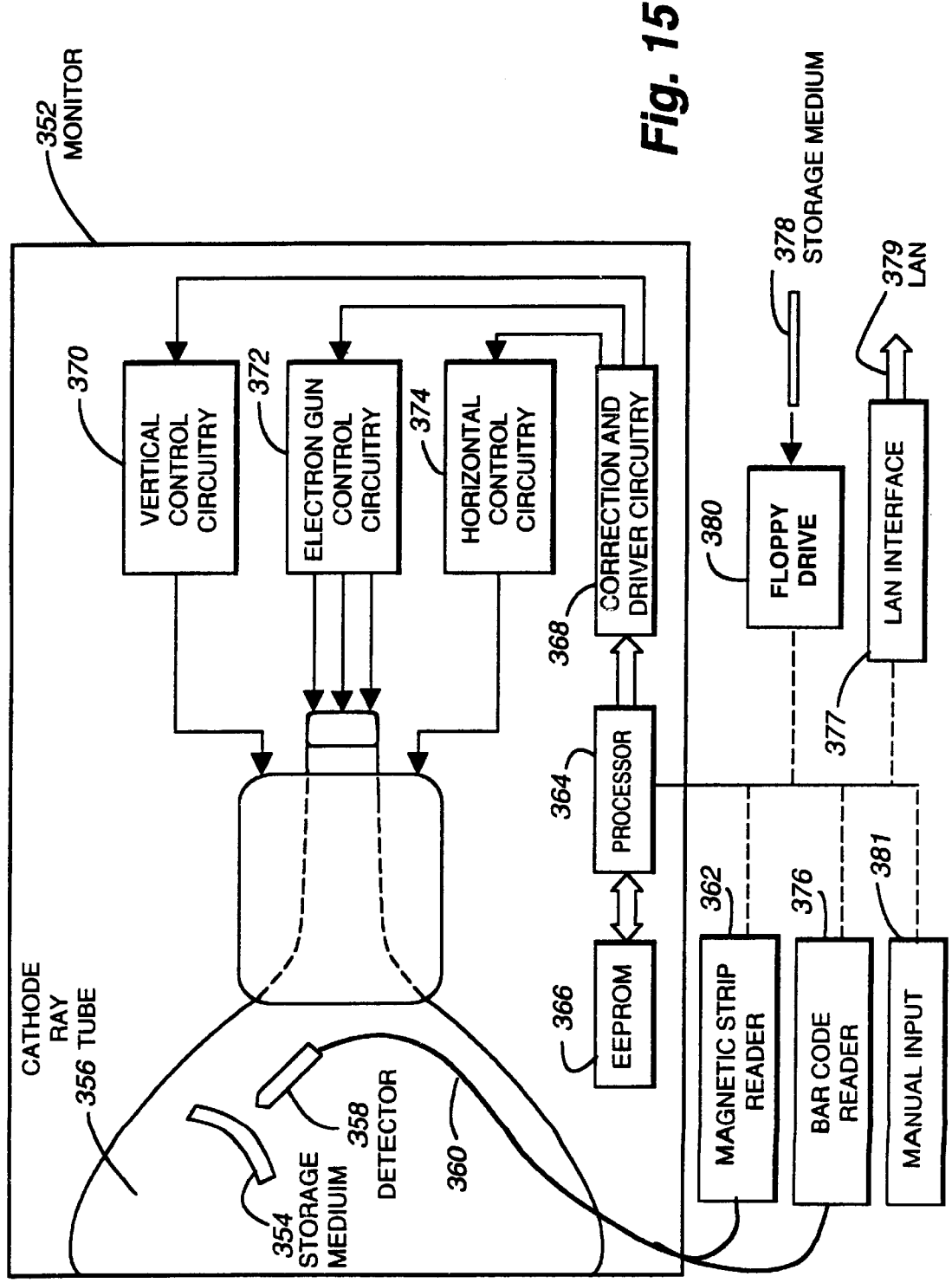
FIG. 15 is a schematic illustration of a monitor that is coupled to various types of devices for reading stored correction factor data pertaining to the cathode ray tube.

Alternatively, an identification number identifying the particular cathode ray tube can be stored in any of the various storage devices identified above. This identification number can then be used to access the correction factor data that is stored on some other medium such as a CD ROM, a network LAN, a server on the Internet, etc. FIG. 15 is a schematic block diagram of a monitor 352 having a storage medium 354 attached to the cathode ray tube 356. As shown in FIG. 15, the storage medium 354 can comprise any sort of storage medium for storing the correction factor data on the cathode ray tube. The storage medium 354 can comprise an optical or magnetic storage medium, or other desired alternative. For example, the storage medium 354 may comprise a bar code which is scanned manually by a detector 358 and transmitted through a connector 360 to a bar code reader 376. The bar code reader 376 reads the bar code that comprises the storage medium 354 and decodes the information to produce the correction factor data that is transmitted to a processor 364 that is included within monitor 352. The correction factor data is processed by processor 364 which is coupled to EEPROM 366 and correction and driver circuitry 368, which is, in turn, coupled to vertical control circuitry 370, electron gun control circuitry 372 and horizontal control circuitry 374. In the embodiment illustrated in FIG. 15, EEPROM 366, processor 364 and correction and driver circuitry 368 are all provided as part of the chassis of monitor 352.

FIG. 15 also illustrates the manner in which storage medium 354 can comprise a magnetic storage medium such as a magnetic strip that is attached directly to the cathode ray tube 356. In this instance, detector 358 reads the magnetic information stored on the magnetic strip 354 and transmits the information via connector 360 to magnetic strip reader 362. The magnetic strip reader 362 reads the magnetic information and generates correction factor data that is transmitted to processor 364, as described above. As pointed out above, storage medium 354 may also just contain an identification number that is transmitted to processor 364. Processor 364 may then access LAN 379 via LAN interface 377 to retrieve correction factor data. Also, the identification number may be entered by hand via manual input 381 and processor 364 can access LAN 379 in the manner described above to retrieve the correction factor data.

FIG. 15 also illustrates the manner in which correction factor data can be stored on a separate storage medium that is shipped with the cathode ray tube 356 or otherwise made available. As shown in FIG. 15, the correction factor data and any other desired software can be included on storage medium 378 which is read by drive 380. Drive 380 generates correction factor data that is transmitted to processor 364 that forms a part of the chassis of monitor 352. Of course, storage medium 378 can comprise any magnetic or optical storage medium, or other storage medium, while drive 380 can comprise a suitable reader for the particular medium of storage that has been selected.

Figure 16:
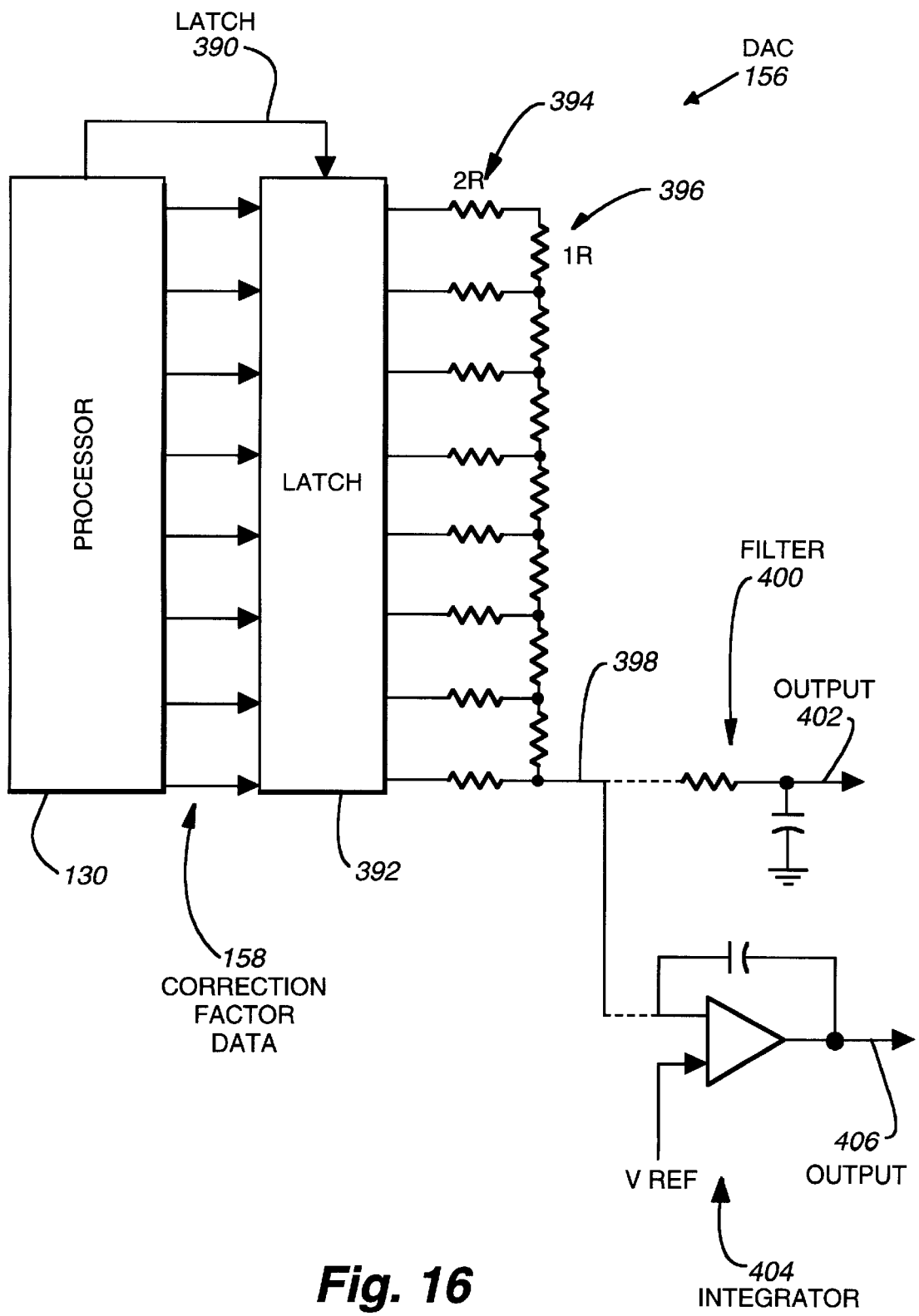
FIG. 16 is a schematic block diagram of a digital to analog converter.

FIG. 16 is a schematic illustration of a particular implementation of a digital to analog converter (DAC) 156 such as disclosed in FIG. 5. As shown in FIG. 16, the processor 130 generates a correction factor data signal 158 that can comprise a 8-bit byte as shown in FIG. 16. Processor 130 may also generate a latch signal 390 which is applied to latch 392 that holds the value of the correction factor data 158. These values are applied to resistors 394 that all have the same resistance value 2R. Each of the resistors 394 is coupled in series to resistors 396 that have a value R, so that each of the inputs of the correction factor data 158 is weighted separately. The resultant output 398 is a digitized signal that is a decoded version of the 8-bit byte correction factor data signal 158. The digitized signal 398 can then be filtered in a filter 400 to produce an analog output 402, or integrated in an integrator 404 to produce an analog output 406. In this manner, the correction factor data signal 158 from processor 130 is decoded to form an analog output signal.

Figure 17:
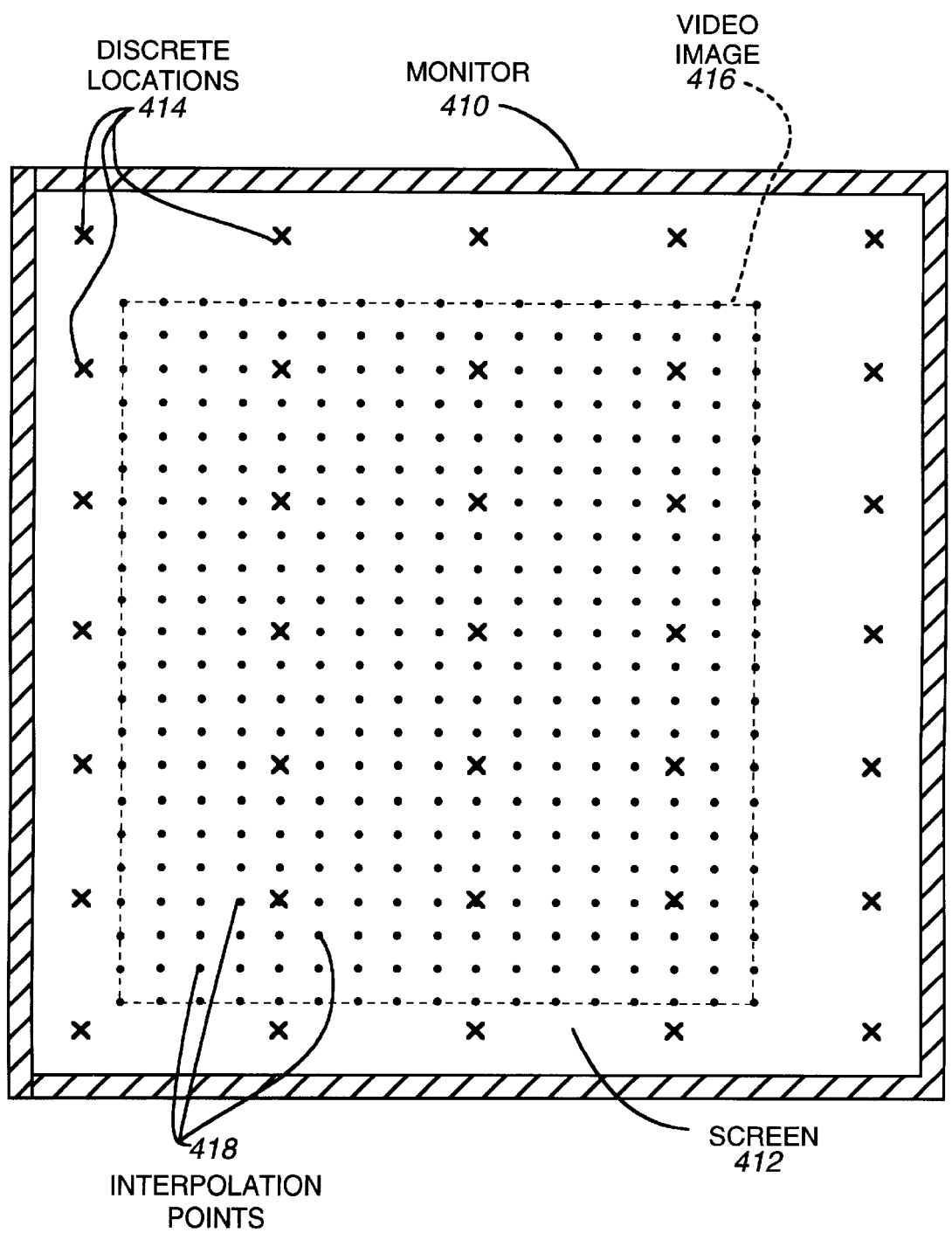
FIG. 17 is a schematic illustration of a monitor having a series of interpolation points that have associated correction factor data that is generated from a smaller set of correction factor data provided at a series of discrete locations.

FIG. 17 is a schematic diagram illustrating a monitor 410. As shown in FIG. 17, monitor 410 has a screen 412 that has a series of 25 discrete physical locations 414 that have been selected on the face of the screen. The 25 discrete locations 414 are distributed evenly over the surface of screen 412, but can be arranged in any desired order. As disclosed above, correction factor data is generated for each of the discrete locations 414. A video image 416 is generated on the screen 14 in the manner illustrated in FIG. 17. The video image 416 is positioned on the screen 412 so that it does not coincide with the 25 discrete locations 414. Typically, the video image 416 is generated and displayed on screen 412 so that the size of the video image 416 coincides with the discrete locations 414. In the manner, the correction factor data that is stored for the discrete locations 414 can be directly utilized to align the video image 416. However, as shown in FIG. 17, the video image 416 is positioned in a manner that does not directly coincide with the discrete locations 414. Hence, correction factor data must be generated for a series of interpolation points 418 that can be selected to correspond with the physical location of the video image 416. Moreover, any number of interpolation points 418 can be selected to coincide with the desired amount of correction factor data to be utilized by the correction and driver circuitry 46 (FIG. 5). As pointed out above, the number of interpolation points can also be different for each of the correction factor parameters. Processor 130 (FIG. 5) can utilize standard two-dimensional interpolation processes to generate the interpolation points from the correction factor data at the 25 discrete locations 414. For example, the techniques disclosed in "Interpolation in Two or More Dimension," Section 3.6, *Numerical Recipes in C, the Art of Scientific Computing*, Second Edition, William H. Press, Saul A. Teukolsky, William T. Vetterling and Brian P. Flannery, Cambridge University Press, 1995 can be used to provide a method for generating the values of the correction favor data at interpolation points 418. In this manner, the video image 416 can be generated from correction factor data that is calculated by processor 130 and stored in nonvolatile storage 132 (FIG. 5) to provide an aligned image. Of course, this process can be used to generate a series of interpolation points when the video image 416 does physically coincide with the discrete locations 414, as illustrated in FIG. 17, correction factor data can be generated and utilized by the correction and driver circuitry 46 (FIG. 5) for any desired location of the video image 416 on screen 412 without the necessity of storing a large amount of data. In this manner, a much smaller set of correction factor data for a plurality of correction factor parameters can be stored with the cathode ray tube 10 and later utilized to generate a much larger set of correction factor data to generate a precisely aligned video image 416.

Present invention, therefore, provides a novel and unique method and apparatus for generating correction factor data that is representative of the distortions of a cathode ray tube and storing the correction factor data with the cathode ray tube. This data can be generated at the factory where the cathode ray tube and coils are joined to prevent duplication of effort at the monitor factory. Exit criteria for cathode ray tubes can be easily determined at the cathode ray tube factory. Unnecessarily stringent exit criteria for cathode ray tubes can be eliminated to lessen costs of the cathode ray tube and provide greater throughput. Exit criteria can be generated with a vision system using a golden tube standard so that a set of highly reliable exit criteria data can be selected. Gain matrix tables can be employed in the vision system when generating the correction factor data to lessen the number of iterations to generate the correction factor data. Correction factor data representative of the distortion characteristics for the entire tube surface, including areas such as corners of the tube that have large distortion factors, can be generated so that a video image can be aligned on any portion of the screen surface, in a simple and easy manner using a minimal amount of stored data.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention, except insofar as limited by the prior art.

What is claimed is:

1. A system for generating and storing correction factor data representative of distortion characteristics of a cathode ray tube to align a video image on said cathode ray tube comprising:

a pattern generator that generates a video pattern that is displayed on said cathode ray tube;

an alignment camera that generates image signals representative of said video pattern;

an alignment computer that captures said image signals of said video pattern, measures distortion data for a plurality of correction factor parameters at a series of discrete locations on said cathode ray tube and generates correction factor data from said distortion data;

a universal monitor board that generates driver signals in response to said correction factor data to align said video pattern; and, a characterization module coupled to said cathode ray tube that stores said correction factor data.

2. A system for generating and storing correction factor data representative of distortion characteristics of a cathode ray tube to align a video image on said cathode ray tube comprising:

a pattern generator that generates a video pattern that is displayed on said cathode ray tube;

an alignment camera that generates image signals representative of said video patterns;

an alignment computer that captures said image signals of said video pattern, measures distortion data for a plurality of correction factor parameters at a series of discrete locations on said cathode ray tube band generates correction factor data from said distortion data, said alignment computer comprising:

a frame grabber that captures said image signals;

a gain matrix table that predicts correction factor data for aligning said video image by determining interactions of correction factor parameters;

a universal monitor board that generates driver signals in response to said correction factor data to align said video pattern; and a characterization module coupled to said cathode ray tube that stores said correction factor data.

3. The system of claim 1 wherein said universal monitor board has correction and driver circuitry, and control circuits that are adjusted to correspond to monitor boards for use with said cathode ray tube.

4. The system of claim 1, wherein said universal monitor board comprises an actual monitor board used with said cathode ray tube in a monitor.

5. A method of generating and storing correction factor data relating to the characteristics of a cathode ray tube comprising the steps of:

capturing an image of a video pattern on said cathode ray tube using a vision system;

generating said correction factor data for a plurality of correction factor parameters at a plurality of discrete locations on said cathode ray tube;

storing said correction factor data with said cathode ray tube for later use in aligning a video signal on a monitor.

6. The method of claim 5 further comprising the step of providing said correction factor data on a disk.

7. The method of claim 5 further comprising the step of providing said correction factor data on a network.

8. The method of claim 6 further comprising the step of retrieving said correction factor data from said disk by using an identification number identifying said cathode ray tube.

9. The method of claim 7 further comprising the step of retrieving said correction factor data from said network using an identification number identifying said cathode ray tube.

10. An apparatus for storing correction factor data and generating driver signals to produce an aligned video image signal on a cathode ray tube monitor comprising:

a memory associated with said cathode ray tube that stores said correction factor data;

a decoder that transforms said correction factor data into correction signals;

a logic device that transfers said correction factor data to said decoder;

control circuitry that generates said driver signals in response to said correction signals.

11. An apparatus for generating correction control signals for driving control circuitry to produce an aligned video image on a display comprising:

a vision system that captures an image of a video pattern that is displayed on said display and that generates correction factor data that is representative of distortion characteristics of said display at a plurality of discrete locations on said display;

a memory that stores said correction factor data;

correction and driver circuitry that decodes said correction factor data and generates said correction control signals in response to said correction factor data.

12. The apparatus of claim 11 further comprising:

a processor that reads said correction factor data from said memory and transfers said correction factor data to said correction and driver circuitry.

13. The apparatus of claim 11 wherein said correction and driver circuitry comprises:

decoders that transform said correction factor data into correction signals.

14. The apparatus of claim 13 wherein said correction and driver circuitry further comprises:

integrators that integrate said correction signals to produce correction factor signals.

15. The apparatus of claim 14 wherein said correction and driver circuitry further comprises:

summing amplifiers that combine said correction factor signals to produce said correction control signals.

16. The apparatus of claim 13 wherein said decoders comprise:

pulse width modulators that generate pulse width modulation signals having a predetermined pulse width in response to said correction factor data.

17. The apparatus of claim 13 wherein said decoders comprise:

pulse density modulators that generate pulse density modulation signals having a predetermined pulse density in response to said correction factor data.

18. The apparatus of claim 12 wherein said processor comprises a logic state machine.

19. The apparatus of claim 12 wherein said processor comprises a micro-processor.

20. The apparatus of claim 12 wherein said memory comprises a serial EEPROM.

21. A method of generating an aligned video signal on a display comprising the steps of:

capturing an image of a video pattern on said display using a vision system;

generating correction factor data from distortion data measured from said captured image for a plurality of correction factor parameters;

storing said correction factor data with said display;

reading said correction factor data stored with said display;

decoding said correction factor data and generating driver signals in response to said correction factor data that produce said aligned video signal on said display.

22. The method of claim 21 wherein said step of storing said correction factor data comprises the step of:

storing data on a nonvolatile electronic storage device mounted on said cathode ray tube.

23. The method of claim 21 wherein said step of storing said correction factor data comprises the step of:

storing data on a storage disk.

24. The method of claim 21 wherein said step of storing said correction factor data comprises the step of:

storing data on a magnetic strip.

25. The method of claim 21 wherein said step of storing said correction factor data comprises the step of:

storing data on a bar code.

26. The method of claim 21 wherein said step of decoding said correction factor data and generating driver signals comprises the step of:

generating pulse width modulation signals from said correction factor data;

integrating said pulse width modulation signals to produce analog correction factor signals that are applied to control circuitry that generate said driver signals.

27. The method of claim 21 wherein said step of decoding said correction factor data and generating driver signals comprises the steps of:

generating pulse density modulation signals from said correction factor data;

integrating said pulse density modulation signals to produce analog correction factor signals that are applied to control circuitry that generate said driver signals.

28. The method of claim 21 wherein said step of decoding said correction factor data and generating driver signals comprises the steps of:

generating a digitized signal from said correction factor data;

filtering said digitized signal to produce an analog correction factor signal that is applied to control circuitry that generates said driver signals.

29. A method of generating and storing correction factor data representative of distortion characteristics of a cathode ray tube and using said correction factor data for aligning a video signal on said cathode ray tube comprising the steps of:

generating said correction factor data for a plurality of correction factor parameters at a plurality of discrete physical locations on said cathode ray tube using a vision system before said cathode ray tube is disposed in a monitor;

storing said correction factor data in a storage device mounted on said cathode ray tube;

reading said correction factor data stored with said cathode ray tube after said cathode ray tube is disposed in a monitor;

generating driver signals from said correction factor data to align said video signal on said cathode ray tube that is disposed in said monitor.

30. A method of determining the magnitude of distortion characteristics that can be corrected in a video image displayed on a cathode ray tube comprising the steps of:

generating a first set of correction factor data that produces driver signals that cause said video image to distort a predetermined amount in a first direction;

measuring and storing a first set of distortion data that is representative of the magnitude of said distortion characteristics that can be corrected in said first direction;

generating a second set of correction factor data that produces driver signals that cause said video image to distort a predetermined amount in a second direction;

measuring and storing a second set of distortion data for said second set of correction factor data that is representative of the magnitude of said distortion characteristics that can be corrected in said second direction;

selecting a set of maximum correctable distortion data from said stored first and second set of distortion data that represent maximum distortion characteristics that can be corrected in said video image displayed on said cathode ray tube.

31. A method of determining the magnitude of distortion characteristics that can be corrected in a video image displayed on a cathode ray tube comprising the steps of:

generating a first set of correction factor data that produces driver signals that cause said video image to distort a predetermined amount in a first direction;

measuring and storing a first set of distortion data that is representative of the magnitude of said distortion characteristics that can be corrected in said first direction;

generating a second set of correction factor data that produces driver signals that cause said video image to distort a predetermined amount in a second direction;

measuring and storing a second set of distortion data for said second set of correction factor data that is representative of the magnitude of said distortion characteristics that can be corrected in said second direction;

selecting a set of maximum correctable distortion data from said stored first and second set of distortion data that represent maximum distortion characteristics that can be corrected in said video image displayed on said cathode ray tube; and generating a gain matrix table from said correction factor data and said distortion data by determining the interaction of each correction factor parameter with other correction factor parameters and storing said gain matrix table as part of said correction factor data.

32. The method of claim 30 further comprising the steps of:

generating a video signal on a production cathode ray tube;

measuring production cathode ray tube distortions of said video signal;

comparing said distortions of said video signal with said maximum correctable distortion data;

rejecting said production cathode ray tube if said production cathode ray tube distortions are greater than said maximum correctable distortion data.

33. A method of generating and storing correction factor data for use in aligning a cathode ray tube comprising the steps of:
   a. measuring distortion data of a video signal generated on said cathode ray tube;
   b. generating correction factor data from said distortion data;
   c. generating a modified video signal using said correction factor data;
   d. measuring distortion data of said modified video signal and comparing said distortion data with predetermined alignment specifications;
   e. repeating steps b through d if said distortion data of said modified video signal does not meet said predetermined alignment specifications; and
   f. storing said correction factor data when said distortion data meets said predetermined alignment specifications.

34. A method of generating and storing correction factor data for use in aligning a cathode ray tube comprising the steps of:
   a. measuring distortion data of a video signal generated on said cathode ray tube;
   b. generating correction factor data from said distortion data by using a gain matrix table to predict correction factor data by generating expected values of said correction factor data from gain matrix values that indicate the relationship of correction factor data for a plurality of correction factor parameters;
   c. generating a modified video signal using said correction factor data;
   d. measuring distortion data of said modified video signal and comparing said distortion data with predetermined alignment specifications;
   e. repeating steps b through d if said distortion data of said modified video signal does not meet said predetermined alignment specifications; and
   f. storing said correction factor data when said distortion data meets said predetermined alignment specifications.

35. A method of generating and storing correction factor data used to align a cathode ray tube comprising the steps of:
   a. generating a video signal on said cathode ray tube;
   b. capturing a single frame of said video signal;
   c. measuring distortion data of said video signal for a plurality of correction factor parameters at a series of discrete locations on said cathode ray tube;
   d. generating correction factor data from distortion data measured at said series of discrete locations on said cathode ray tube;
   e. generating correction factor signals from said correction factor data;
   f. combining said correction factor signals to produce correction control signals;
   g. generating driver signals in control circuits in response to said correction control signals to drive deflection and control windings and electron guns;
   h. applying said driver signals to said deflection and control windings and said electron guns to produce a modified video signal on said cathode ray tube;
   i. capturing a video frame of said modified video signal;
   j. measuring distortion data of said modified video signal for said plurality of correction factor parameters;
   k. comparing said distortion data of said modified video signal with predetermined alignment specifications of distortion;
   l. repeating steps d through k if said distortion data of said modified video signal does not compare favorably with said predetermined alignment specifications;
   m. storing said correction factor data for use in aligning said cathode ray tube when said distortion data of said modified video signal compares favorably with said predetermined alignment specifications.

36. A method of generating correction factor data for a predetermined number of interpolation points using correction factor data for a lesser predetermined number of discrete locations comprising the steps of:
   generating correction factor data for a plurality of correction factor parameters at said predetermined number of discrete locations from distortion data measured at said discrete locations using a vision system;
   determining the position of each of said predetermined number of interpolation points with respect to said discrete locations;
   generating correction factor data for said plurality of correction factor parameters at said predetermined number of interpolation points by interpolation using said position of said interpolation points with respect to said discrete locations and values of said correction factor data at said discrete locations.

37. The method of claim 36 wherein said position of said predetermined number of interpolation points does not correspond to the position of said discrete locations.

* * * * *